(12) United States Patent
Ikegawa et al.

(10) Patent No.: US 11,604,313 B2
(45) Date of Patent: Mar. 14, 2023

(54) WAVEGUIDE AND MANUFACTURING METHOD THEREOF

(71) Applicants: Yukinori Ikegawa, Milpitas, CA (US); Dayu Zhou, Milpitas, CA (US); Koji Shimazawa, Milpitas, CA (US); Yoshitaka Sasaki, Los Gatos, CA (US); Hiroyuki Ito, Milpitas, CA (US); Yoji Nomura, Milpitas, CA (US)

(72) Inventors: Yukinori Ikegawa, Milpitas, CA (US); Dayu Zhou, Milpitas, CA (US); Koji Shimazawa, Milpitas, CA (US); Yoshitaka Sasaki, Los Gatos, CA (US); Hiroyuki Ito, Milpitas, CA (US); Yoji Nomura, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 17/364,588

(22) Filed: Jun. 30, 2021

(65) Prior Publication Data
US 2023/0003940 A1    Jan. 5, 2023

(51) Int. Cl.
| G02B 6/122 | (2006.01) |
| G02B 6/136 | (2006.01) |
| G11B 5/012 | (2006.01) |
| G11B 13/08 | (2006.01) |
| G11B 5/00 | (2006.01) |
| G02B 6/12 | (2006.01) |

(52) U.S. Cl.
CPC ............ *G02B 6/1228* (2013.01); *G02B 6/136* (2013.01); *G11B 5/012* (2013.01); *G11B 13/08* (2013.01); *G02B 2006/12173* (2013.01); *G11B 2005/0021* (2013.01)

(58) Field of Classification Search
CPC .................................................. G02B 6/1228
See application file for complete search history.

(56) References Cited

U.S. PATENT DOCUMENTS

| 8,619,514 | B1 | 12/2013 | Matsumoto | |
|---|---|---|---|---|
| 8,908,482 | B1 | 12/2014 | Balamane et al. | |
| 10,545,287 | B1 | 1/2020 | Ikegawa et al. | |
| 2002/0168166 | A1* | 11/2002 | Itoh | G02B 6/132 385/129 |
| 2010/0142900 | A1* | 6/2010 | Uchida | G02B 6/305 385/129 |
| 2016/0025922 | A1* | 1/2016 | Kono | G02B 6/1228 385/2 |
| 2019/0064439 | A1* | 2/2019 | Feshali | G02B 6/136 |
| 2019/0265416 | A1* | 8/2019 | Otfried Brusberg | G02B 6/12016 |

* cited by examiner

*Primary Examiner* — Charlie Y Peng
(74) *Attorney, Agent, or Firm* — Oliff PLC

(57) ABSTRACT

A waveguide includes a core and a cladding. The core has an inlet on which light is incident. The core includes a front portion and a rear portion located between the front portion and the inlet. The front portion and the rear portion each have a thickness that is a dimension in a first direction and a width that is a dimension in a second direction. The first direction is orthogonal to a propagation direction of the light. The second direction is orthogonal to the propagation direction of the light and the first direction. The thickness of the front portion decreases with increasing distance from the inlet.

17 Claims, 28 Drawing Sheets

WAVEGUIDE AND MANUFACTURING METHOD THEREOF

BACKGROUND OF THE INVENTION

1. Field of the Invention

The present invention relates to a waveguide for use in thermally-assisted magnetic recording to write data on a recording medium with the coercivity thereof lowered by applying near-field light thereto, and a manufacturing method thereof.

2. Description of the Related Art

With recent increases in recording density of magnetic recording devices such as magnetic disk drives, there has been demand for improved performance of thin-film magnetic heads and recording media. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium.

To increase the recording density of a magnetic recording device, it is effective to make the magnetic fine particles of the recording medium smaller. Making the magnetic fine particles smaller, however, disadvantageously lowers the thermal stability of magnetization of the magnetic fine particles. To overcome this problem, it is effective to increase the anisotropic energy of the magnetic fine particles. However, increasing the anisotropic energy of the magnetic fine particles leads to an increase in coercivity of the recording medium, thereby making it difficult to perform data writing with existing magnetic heads.

As a solution to the problems described above, there has been proposed a technology called thermally-assisted magnetic recording. The technology uses a recording medium having high coercivity. When writing data, a write magnetic field and heat are applied almost simultaneously to the area of the recording medium where to write data, so that the area rises in temperature and drops in coercivity for data writing. The area where data is written subsequently falls in temperature and rises in coercivity to increase in thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically emitted from a laser diode mounted on the slider, and is guided, by a waveguide provided in the slider, to the plasmon generator disposed near the medium facing surface of the slider.

U.S. Pat. No. 8,619,514 B1 and U.S. Pat. No. 8,908,482 B1 disclose waveguides for use in a thermally-assisted magnetic recording head. U.S. Pat. No. 8,619,514 B1 discloses a waveguide formed of a core material that reduces in width with decreasing distance to the air bearing surface of a slider. U.S. Pat. No. 8,908,482 B1 discloses a waveguide core that increases in width with decreasing distance to a near-field transducer (NFT) located near a medium facing surface.

A waveguide core is formed by photolithographically patterning a dielectric layer, for example. In photolithographically forming a core having a sharp tip portion, like the cores of the waveguides disclosed in U.S. Pat. No. 8,619,514 B1 and U.S. Pat. No. 8,908,482 B1, a photoresist mask needs to be removed while preventing the breaking of the tip portion of the core. Specifically, for example, the photoresist mask needs to be removed without the use of ultrasonic waves which can enhance the exfoliation efficiency of the photoresist mask. This, however, can result in residue due to the photoresist mask. Moreover, high resolution photolithography is needed to make the tip portion sharp. However, high resolution photolithography contributes to increased cost.

SUMMARY OF THE INVENTION

An object of the present invention is to provide a waveguide having high reliability and capable of cost reduction.

A waveguide according to the present invention includes a core allowing light to propagate therethrough and a cladding located around the core. The core is formed of a first dielectric material having a first refractive index and has an inlet on which the light is incident. The cladding is formed of a second dielectric material having a second refractive index lower than the first refractive index. The core includes a front portion and a rear portion located between the front portion and the inlet. The front portion and the rear portion each have a thickness that is a dimension in a first direction and a width that is a dimension in a second direction. The first direction is orthogonal to a propagation direction of the light. The second direction is orthogonal to the propagation direction of the light and the first direction. The thickness of the front portion decreases with increasing distance from the inlet.

In the waveguide according to the present invention, the width of the front portion may decrease with increasing distance from the inlet. In such a case, the front portion may have a front end farthest from the inlet. The width of the front portion at the front end may be greater than the thickness of the front portion at the front end.

In the waveguide according to the present invention, the front portion may have a top surface and a bottom surface located at both ends in the first direction. The bottom surface may be inclined so as to approach the top surface with increasing distance from the inlet. In such a case, an angle that the bottom surface forms with respect to the propagation direction of the light may fall within a range of 0.1° to 5°.

In the waveguide according to the present invention, the front portion may have a minimum thickness of 80 nm or less. The dimension of the front portion in the propagation direction of the light may fall within a range of 50 to 120 μm.

In the waveguide according to the present invention, the thickness of the rear portion may be greater than or equal to the maximum thickness of the front portion. The width of the rear portion may be greater than or equal to the maximum width of the front portion.

In the waveguide according to the present invention, the core may include a first layer including the front portion and the rear portion, and a second layer stacked on the first layer. In such a case, the first layer and the second layer may each have a front end farthest from the inlet. The front end of the second layer may be located farther from the inlet than is the front end of the first layer. In such a case, the first layer and the second layer each may further have a rear end opposite the front end. The inlet may be constituted by the rear end of the first layer and the rear end of the second layer.

A manufacturing method for the waveguide according to the present invention includes a step of forming the core and a step of forming the cladding. The step of forming the cladding includes a step of forming a part of the cladding and a step of forming a rest of the cladding. The step of forming the core includes a step of forming a photoresist mask on the part of the cladding, the photoresist mask including a thickness changing portion that increases in thickness with increasing distance from a position at which the inlet is to be formed, a step of etching the part of the cladding and the photoresist mask so that an accommodation portion for accommodating the front portion and the rear portion is formed in the part of the cladding, and a step of forming the front portion and the rear portion in the accommodation portion.

In the manufacturing method for the waveguide according to the present invention, the photoresist mask may be formed by patterning a photoresist layer using a photomask. The photomask may include a transmittance changing area that changes in transmittance with increasing distance from the position at which the inlet is to be formed. In such a case, the transmittance changing area may include a plurality of graphic patterns. Each of the plurality of graphic patterns may decrease in size with increasing distance from the position at which the inlet is to be formed. In such a case, each of the plurality of graphic patterns may have a size smaller than or equal to the photolithographic resolution. A distance between centers of adjoining two of the plurality of graphic patterns may be less than or equal to the photolithographic resolution.

In the manufacturing method for the waveguide according to the present invention, the step of forming the core may further include a step of forming a metal layer on the part of the cladding before the step of forming the photoresist mask. In such a case, the step of forming the core may further include a step of forming an anti-reflective coating on the metal layer.

According to the present invention, a waveguide having high reliability and capable of cost reduction can be implemented.

Other and further objects, features and advantages of the present invention will appear more fully from the following description.

DETAILED DESCRIPTION OF THE PREFERRED EMBODIMENTS

First Embodiment

Figure 5:
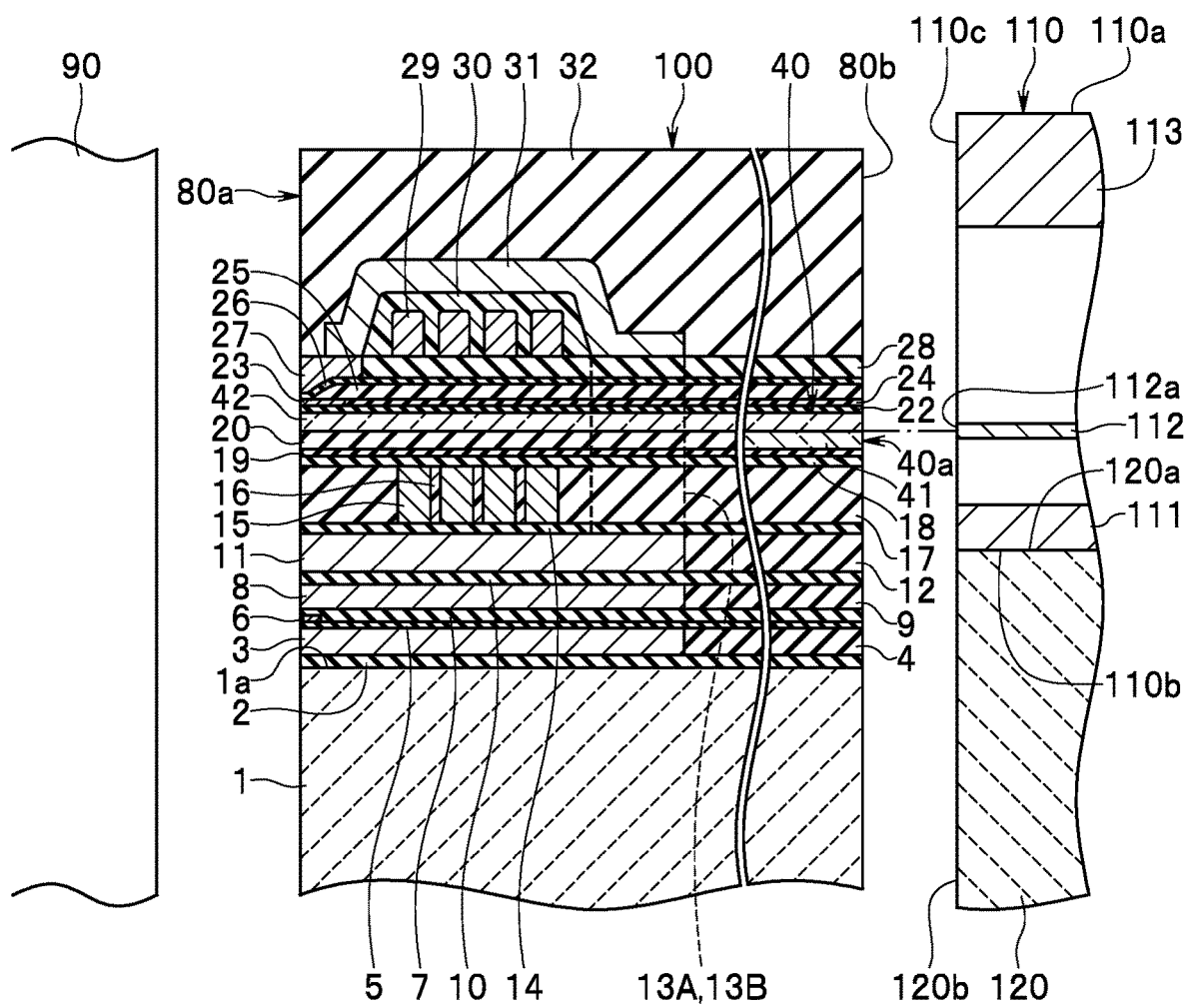
FIG. 5 is a cross-sectional view showing the configuration of the thermally-assisted magnetic recording head of the first embodiment of the invention.
Figure 5:
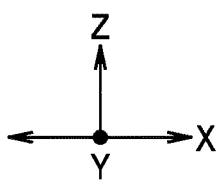
Figure 6:
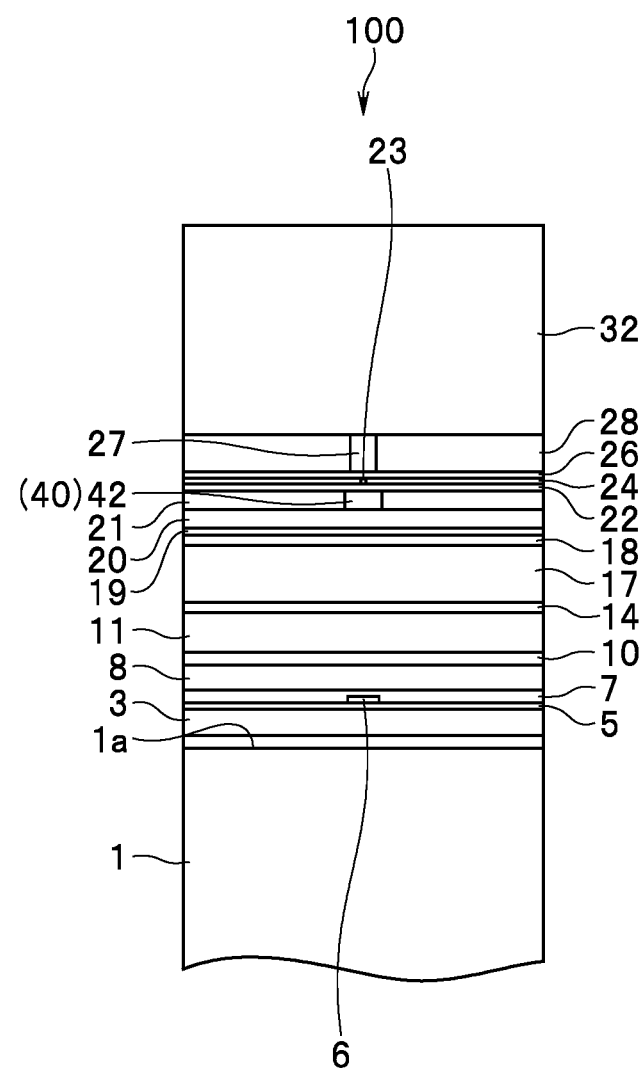
FIG. 6 is a front view showing the medium facing surface of the thermally-assisted magnetic recording head of the first embodiment of the invention.

Preferred embodiments of the present invention will now be described in detail with reference to the drawings. First, reference is made to FIG. 5 and FIG. 6 to describe the configuration of a thermally-assisted magnetic recording head of a first embodiment of the invention. FIG. 5 is a cross-sectional view showing the configuration of the thermally-assisted magnetic recording head. FIG. 6 is a front view showing the medium facing surface of the thermally-assisted magnetic recording head.

A thermally-assisted magnetic recording head of the present embodiment includes a slider 100 configured to fly over the surface of a recording medium 90 while the medium 90 is rotating. The slider 100 is generally hexahedron-shaped and has a medium facing surface 80a configured to face the recording medium 90, a rear surface 80b opposite thereto, and four surfaces connecting the medium facing surface 80a and the rear surface 80b. When the recording medium 90 rotates, an airflow passing between the recording medium 90 and the slider 100 causes a lift to be exerted on the slider 100. The lift causes the slider 100 to fly over the surface of the recording medium 90.

Here, we define X direction, Y direction, and Z direction as follows. The X direction is a direction perpendicular to the medium facing surface 80a. The Y direction is a direction across the tracks of the recording medium 90, i.e., the track width direction. The Z direction is the direction of travel of the recording medium 90 as viewed from the slider. The X, Y, and Z directions are orthogonal to one another. The Y direction corresponds to the second direction in the present invention. A direction parallel to the Z direction corresponds to the first direction in the present invention.

As shown in FIG. 5 and FIG. 6, the slider 100 includes: a substrate 1 formed of a ceramic material such as aluminum oxide-titanium carbide ($Al_2O_3$—TiC) and having a top surface 1a; an insulating layer 2 formed of an insulating material and lying on the top surface 1a of the substrate 1; a bottom shield layer 3 formed of a magnetic material and lying on the insulating layer 2; and an insulating layer 4 lying on the insulating layer 2 and surrounding the bottom shield layer 3. The insulating layers 2 and 4 are formed of alumina ($Al_2O_3$), for example. The Z direction is also a direction perpendicular to the top surface 1a of the substrate 1.

For the positions of components of the slider 100, the term □above □as used herein refers to positions located in a direction that is parallel to the Z direction and away from the top surface 1a with respect to a reference position, and □below □refers to positions located in a direction that is parallel to the Z direction and toward the top surface 1a with respect to the reference position. For the surfaces of the components of the thermally-assisted magnetic recording head, the term □top surface □as used herein refers to the surface farthest from the top surface 1a, and □bottom surface □refers to the surface closest to the top surface 1a.

The slider 100 further includes: a bottom shield gap film 5 which is an insulating film lying on the top surfaces of the bottom shield layer 3 and the insulating layer 4; a magnetoresistive (MR) element 6 serving as a read element lying on the bottom shield gap film 5; two leads (not illustrated) connected to the MR element 6; and a top shield gap film 7 which is an insulating film disposed on the MR element 6.

An end of the MR element 6 is located in the medium facing surface 80a. The MR element 6 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The slider 100 further includes a top shield layer 8 formed of a magnetic material and lying on the top shield gap film 7, and an insulating layer 9 lying on the top shield gap film 7 and surrounding the top shield layer 8. The insulating layer 9 is formed of alumina, for example. The parts from the bottom shield layer 3 to the top shield layer 8 constitute a read head unit.

The slider 100 further includes a nonmagnetic layer 10 formed of a nonmagnetic material and lying on the top shield layer 8 and the insulating layer 9, and a write head unit lying on the nonmagnetic layer 10. The nonmagnetic layer 10 is formed of alumina, for example.

The write head unit includes a return pole layer 11 formed of a magnetic material and lying on the nonmagnetic layer 10, and an insulating layer 12 lying on the nonmagnetic layer 10 and surrounding the return pole layer 11. The return pole layer 11 has an end face located in the medium facing surface 80a. The insulating layer 12 is formed of alumina, for example.

The write head unit further includes two coupling sections 13A and 13B located away from the medium facing surface 80a and lying on a part of the return pole layer 11, an insulating layer 14 lying on another part of the return pole layer 11 and on the insulating layer 12, and a coil 15 lying on the insulating layer 14. The coupling sections 13A and 13B are formed of a magnetic material. Each of the coupling sections 13A and 13B includes a first layer lying on the return pole layer 11, and a second, a third, and a fourth layer stacked in this order on the first layer. The first layer of the coupling section 13A and the first layer of the coupling section 13B are arranged to be adjacent in the track width direction (the X direction). The coil 15 is wound around the first layers of the coupling sections 13A and 13B. The coil 15 is formed of a conductive material such as copper. The insulating layer 14 is formed of alumina, for example.

The write head unit further includes: an insulating layer 16 lying in the space between every adjacent turns of the coil 15; an insulating layer 17 around the coil 15; and an insulating layer 18 on the coil 15 and the insulating layers 16 and 17. The insulating layer 16 is formed of photoresist, for example. The insulating layers 17 and 18 are formed of alumina, for example. The first layers of the coupling sections 13A and 13B are embedded in the insulating layers 14 and 17.

The write head unit further includes a waveguide according to the present embodiment. The waveguide includes a core 40 allowing light to propagate therethrough, and a cladding around the core 40. As shown in FIG. 5, the core 40 has an inlet 40a located in the rear surface 80b. Further, the core 40 includes a first layer 41 and a second layer 42 stacked in the Z direction.

The cladding includes cladding layers 19, 20, 21 and 22. The cladding layer 19 lies on the insulating layer 18. The first layer 41 of the core 40 lies on the cladding layer 19. The cladding layer 20 lies on the cladding layer 19 and surrounds the first layer 41 of the core 40. The second layer 42 of the core 40 lies on the first layer 41 of the core 40 and the cladding layer 20. The cladding layer 21 lies on the cladding layer 20 and surrounds the second layer 42 of the core 40. The cladding layer 22 lies on the second layer 42 of the core 40 and the cladding layer 21.

The core 40 is formed of a first dielectric material that transmits laser light to be described later. The first dielectric material has a first refractive index. The cladding, which includes the cladding layers 19, 20, 21 and 22, is formed of a second dielectric material having a second refractive index lower than the first refractive index. An example of the first dielectric material is tantalum oxide (TaOx) or niobium oxide (NbOx), where x represents any number larger than 0. An example of the second dielectric material is silicon oxide ($SiO_2$) or alumina.

The second layers of the coupling sections 13A and 13B are embedded in the insulating layer 18 and the cladding layers 19 and 20. The third layers of the coupling sections 13A and 13B are embedded in the cladding layer 21. The third layer of the coupling section 13A and the third layer of the coupling section 13B are located on opposite sides of the core 40 in the track width direction (the X direction), each being at a distance from the core 40.

The write head unit further includes a plasmon generator 23. The plasmon generator 23 lies on the cladding layer 22 in the vicinity of the medium facing surface 80a. The plasmon generator 23 is configured to excite surface plasmons thereon on the principle to be described later. The plasmon generator 23 is formed of, for example, one of Au, Ag, Al, Cu, Pd, Pt, Rh and Ir, or an alloy composed of two or more of these elements. The shape of the plasmon generator 23 will be described in detail later.

The write head unit further includes a dielectric layer 24 lying on the cladding layer 22 and surrounding the plasmon generator 23, a dielectric layer 25 disposed to cover the dielectric layer 24 and part of the plasmon generator 23, and a dielectric layer 26 lying on the plasmon generator 23 and the dielectric layer 25. The dielectric layer 25 has a top surface, and an end face closest to the medium facing surface 80a. The distance from the medium facing surface 80a to any point on the aforementioned end face of the dielectric layer 25 decreases with decreasing distance from the point to the top surface 1a of the substrate 1. The dielectric layers 24 to 26 are formed of alumina, for example.

The write head unit further includes a main pole 27 formed of a magnetic material. The main pole 27 is disposed on the dielectric layer 26 in such a manner as to ride over the aforementioned end face and part of the top surface of the dielectric layer 25. The plasmon generator 23 lies between the core 40 and the main pole 27. The main pole 27 has an end face located in the medium facing surface 80a.

The write head unit further includes a dielectric layer 28 disposed around the main pole 27. The fourth layers of the coupling sections 13A and 13B are embedded in the cladding layer 22 and the dielectric layers 24 to 26 and 28. The top surfaces of the main pole 27, the dielectric layer 28 and the fourth layers of the coupling sections 13A and 13B are even with each other. The dielectric layer 28 is formed of silicon oxide, for example.

The write head unit further includes a coil 29 lying on the dielectric layer 28, an insulating layer 30 disposed to cover the coil 29, and a yoke layer 31 formed of a magnetic material and lying on the main pole 27, the coupling sections 13A and 13B, the dielectric layer 28 and the insulating layer 30. The yoke layer 31 magnetically couples the main pole 27 to the coupling sections 13A and 13B. The coil 29 is wound around portions of the yoke layer 31 that are located on the coupling sections 13A and 13B. The coil 29 is formed of a conductive material such as copper. The insulating layer 30 is formed of photoresist, for example.

The coils 15 and 29 produce magnetic fields corresponding to data to be written on the recording medium 90. The return pole layer 11, the coupling sections 13A and 13B, the yoke layer 31 and the main pole 27 form a magnetic path for passing magnetic fluxes corresponding to the magnetic fields produced by the coils 15 and 29. The coils 15 and 29 are connected in series or in parallel so that the magnetic flux corresponding to the magnetic field produced by the coil 15 and the magnetic flux corresponding to the magnetic field produced by the coil 29 flow in the same direction through the main pole 27. The main pole 27 passes the magnetic flux corresponding to the magnetic field produced by the coil 15 and the magnetic flux corresponding to the magnetic field produced by the coil 29, and produces a write magnetic field for use to write data on the recording medium 90 by means of a perpendicular magnetic recording system.

The slider 100 further includes a protective layer 32 disposed to cover the write head unit. The protective layer 32 is formed of alumina, for example.

The thermally-assisted magnetic recording head further includes a laser diode 110 serving as a light source for emitting laser light, and a support member 120 for supporting the laser diode 110. The support member 120 is formed of a ceramic material such as aluminum oxide-titanium carbide and has a top surface 120a and a bond surface 120b. The bond surface 120b is the surface to be bonded to the rear surface 80b of the slider 100. The top surface 120a is perpendicular to the bond surface 120b and parallel to the top surface 1a of the substrate 1. The laser diode 110 is mounted on the top surface 120a.

The laser diode 110 has a multilayer structure including a lower electrode 111, an active layer 112, and an upper electrode 113. The active layer 112 has a bottom surface facing toward the lower electrode 111, and a top surface facing toward the upper electrode 113. The laser diode 110 has a bottom surface 110a, a top surface 110b, and an exit end face 110c connecting the top surface 110b and the bottom surface 110a. The bottom surface 110a faces toward the top surface 120a of the support member 120. The exit end face 110c faces toward the rear surface 80b of the slider 100. The exit end face 110c includes an exit portion 112a for the laser light, which is located at an end of the active layer 112. The laser diode 110 and the core 40 are positioned with respect to each other so that the laser light emitted from the laser diode 110 will be incident on the inlet 40a of the core 40.

When a predetermined voltage is applied to the laser diode 110 through the lower electrode 111 and the upper electrode 113, laser light is emitted from the exit portion 112a of the laser diode 110. The laser light emitted from the exit portion 112a and incident on the inlet 40a of the core 40 propagates through the core 40. The propagation direction of the laser light is a direction parallel to the X direction, which is the direction from the rear surface 80b to the medium facing surface 80a.

Figure 1:
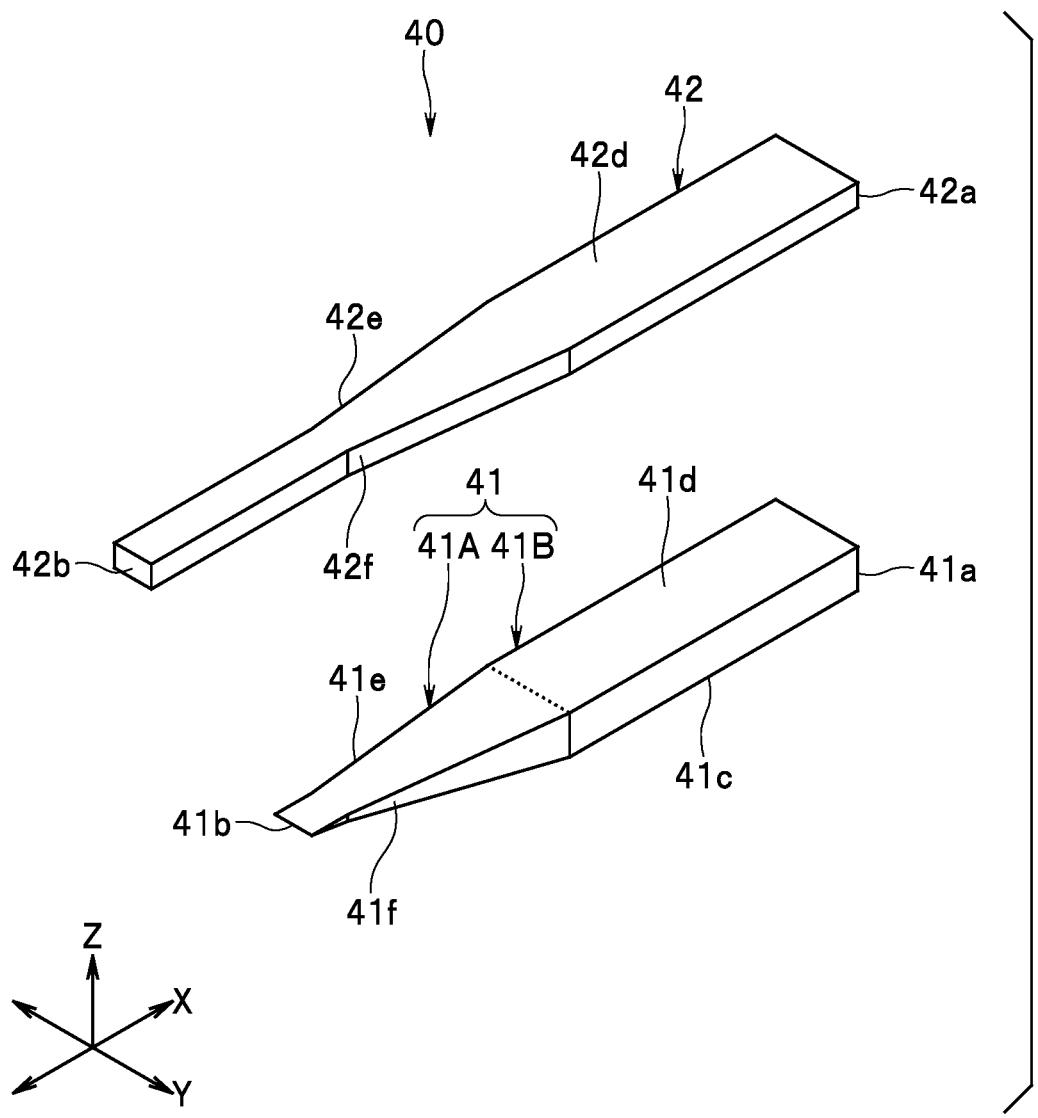
FIG. 1 is a perspective view showing a core of a waveguide according to a first embodiment of the invention.
Figure 2:
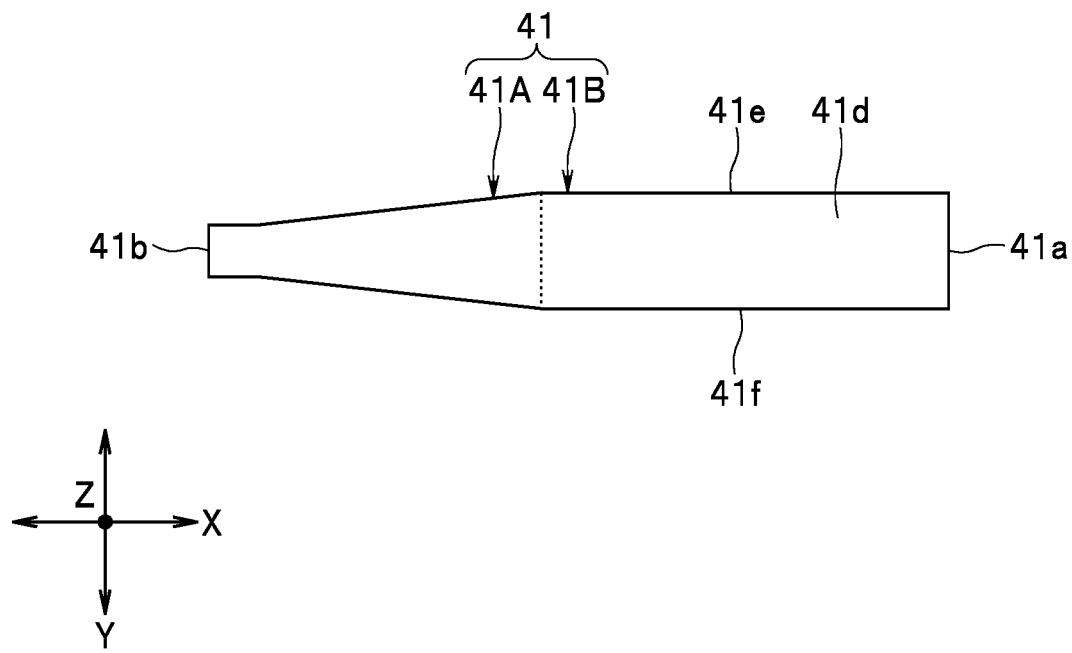
FIG. 2 is a plan view showing a first layer of the core shown in FIG. 1.
Figure 3:
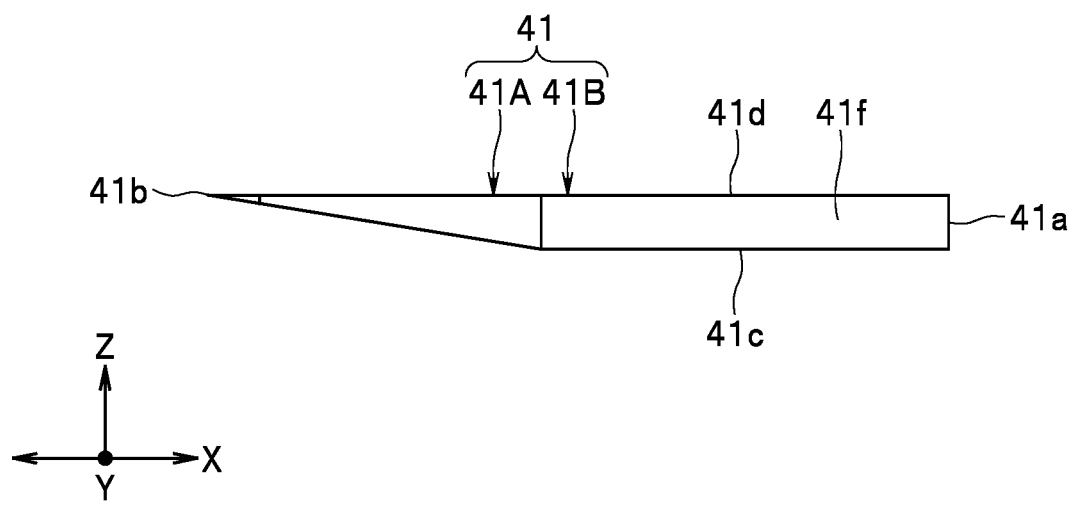
FIG. 3 is a side view of the first layer of the core shown in FIG. 1.
Figure 4:
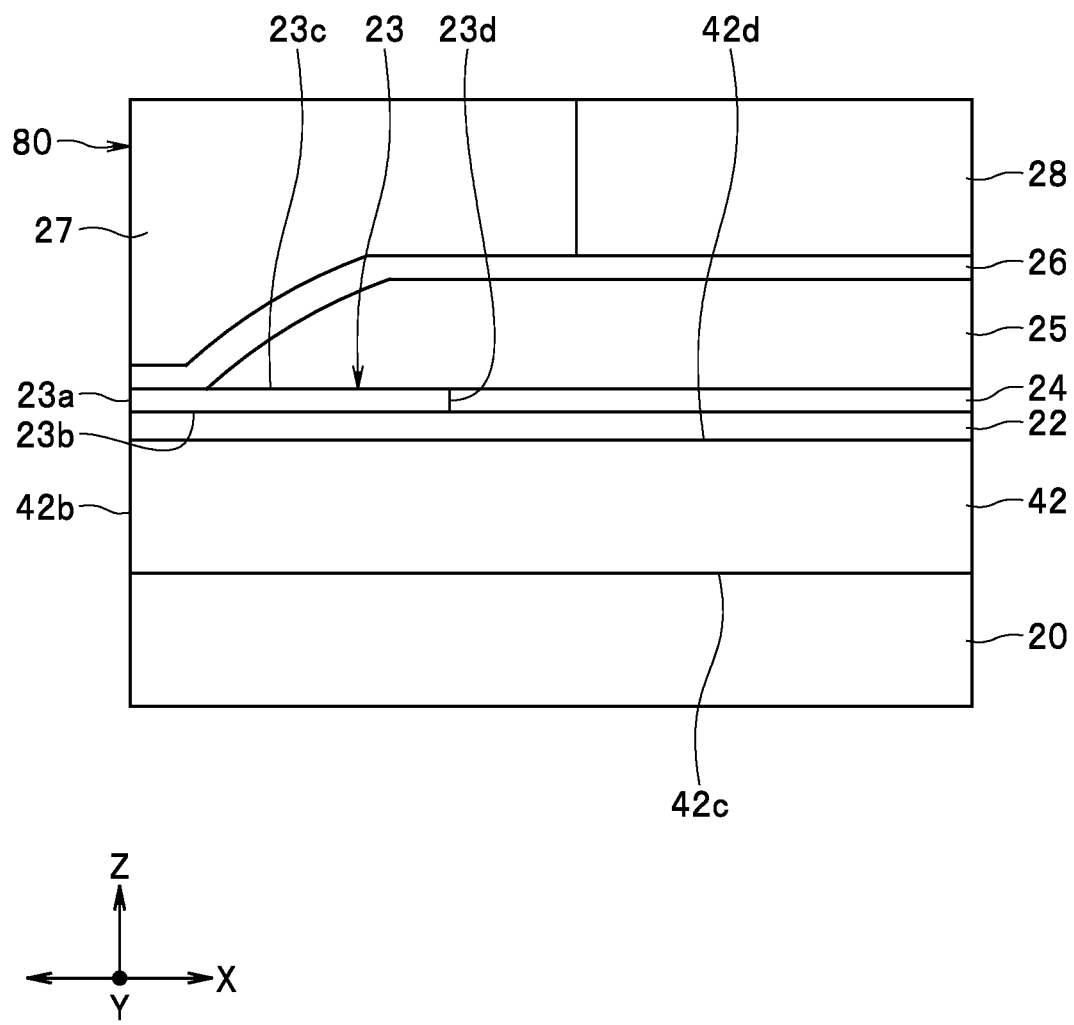
FIG. 4 is a cross-sectional view showing an essential part of a thermally-assisted magnetic recording head of the first embodiment of the invention.

The shape of the core 40 according to the present embodiment will now be described in detail with reference to FIG. 1 to FIG. 5. FIG. 1 is a perspective view showing the core 40 of the waveguide. FIG. 2 is a plan view showing the first layer 41 of the core 40. FIG. 3 is a side view showing the first layer 41 of the core 41. FIG. 4 is a cross-sectional view showing the essential part of the thermally-assisted magnetic recording head. The X, Y and Z directions described previously are also shown in FIG. 1 to FIG. 4. It should be noted that the proportions of the dimensions in the X, Y, and Z directions of the elements of the waveguide shown in FIG. 1 to FIG. 3 do not necessarily correspond to the actual proportions.

As shown in FIG. 1 to FIG. 3 and FIG. 5, the first layer 41 of the core 40 has a front end 41b farthest from the inlet 40a of the core 40, a rear end 41a opposite the front end 41b, a bottom surface 41c and a top surface 41d located on opposite sides in the direction parallel to the Z direction, and a first side surface 41e and a second side surface 41f located on opposite sides in the Y direction. The direction parallel to the Z direction is orthogonal to the propagation direction of the laser light. The Y direction is orthogonal to the propagation direction of the laser light and the direction parallel to the Z direction.

The first layer 41 includes a front portion 41A and a rear portion 41B located between the front portion 41A and the inlet 40a. The front portion 41A has a front end farthest from the inlet 40a, a bottom surface and a top surface located on opposite sides in the direction parallel to the Z direction, and a first side surface and a second side surface located on opposite sides in the Y direction. The front end of the front portion 41A is also the front end 41b of the first layer 41. The bottom surface 41c, the top surface 41d, the first side surface 41e, and the second side surface 41f of the first layer 41 include the bottom surface, the top surface, the first side surface, and the second side surface of the front portion 41A, respectively. The dimension of the front portion in the X direction may fall within, for example, the range of 50 to 120 µm.

The front portion 41A has a thickness that is a dimension in the direction parallel to the Z direction and a width that is a dimension in the Y direction. The thickness of the front portion 41A decreases with increasing distance from the inlet 40a (rear surface 80b). The bottom surface of the front portion 41A (part of the bottom surface 41c of the first layer 41) is inclined so as to approach the top surface of the front portion 41A (part of the top surface 41d of the first layer 41) with increasing distance from the inlet 40a. An angle that the bottom surface of the front portion 41A forms with respect to the X direction preferably falls within, for example, the range of 0.1° to 5°. The reason will be described later. The front end of the front portion 41A (front end 41b) may be an edge formed by the bottom surface of the front portion 41A and the top surface of the front portion 41A intersecting with each other.

At least part of the front portion 41A decreases in width with increasing distance from the inlet 40a (rear surface 80b). In the present embodiment, the front portion 41A includes a constant width portion, which includes the front end of the front portion 41A (front end 41b) and a width changing portion located between the constant width portion and the rear portion 41B. The constant width portion has a constant width regardless of the distance from the inlet 40a. The width of the width changing portion decreases with increasing distance from the inlet 40a. The width of the front portion 41A at the front end of the front portion 41A (front end 41b) is greater than the thickness of the front portion 41A at the front end of the front portion 41A (front end 41b). The front portion 41A has a minimum thickness of, for example, 80 nm or less.

The rear portion 41B has a bottom surface and a top surface located on opposite sides in the direction parallel to the Z direction, and a first side surface and a second side surface located on opposite sides in the Y direction. The bottom surface 41c, the top surface 41d, the first side surface 41e, and the second side surface 41f of the first layer 41 include the bottom surface, the top surface, the first side surface, and the second side surface of the rear portion 41B, respectively.

The rear portion 41B has a thickness that is a dimension in the direction parallel to the Z direction, and a width that is a dimension in the Y direction. The rear portion 41B has a thickness greater than or equal to the maximum thickness of the front portion 41A. The rear portion 41B can have a constant thickness regardless of the distance from the inlet 40a (rear surface 80b). The rear portion 41B has a width greater than or equal to the maximum width of the front portion 41A. The rear portion 41B may have a constant width regardless of the distance from the inlet 40a (rear surface 80b). Alternatively, at least part of the rear portion 41B may decrease in width with increasing distance from the inlet 40a.

The second layer 42 of the core 40 has a front end 42b farthest from the inlet 40a of the core 40, a rear end 42a opposite the front end 42b, a bottom surface 42c and a top surface 42d located on opposite sides in the direction parallel to the Z direction, and a first side surface 42e and a second side surface 42f located on opposite sides in the Y direction. The rear end 41a of the first layer 41 and the rear end 42a of the second layer 42 are located in the rear surface 80b. The inlet 40a of the core 40 is constituted of the rear end 41a of the first layer 41 and the rear end 42a of the second layer 42.

The front end 42b of the second layer 42 is located farther from the inlet 40a (rear surface 80b) than is the front end 41b of the first layer 41. As shown in FIG. 4, the front end 42b of the second layer 42 is located near the plasmon generator 23. The front end 42b of the second layer 42 may be located in the medium facing surface 80a.

The second layer 42 has a thickness that is a dimension in the direction parallel to the Z direction, and a width that is a dimension in the Y direction. The second layer 42 may have a constant thickness regardless of the distance from the inlet 40a (rear surface 80b). At least part of the second layer 42 may decrease in width with increasing distance from the inlet 40a (rear surface 80b). In the present embodiment, the second layer 42 includes a width changing portion, a wide portion located between the width changing portion and the inlet 40a, and a narrow portion located between the width changing portion and the medium facing surface 80a. The width changing portion decreases in width with increasing distance from the inlet 40a. The narrow portion has a width smaller than that of the wide portion. The wide portion and the narrow portion may each have a constant width regardless of the distance from the inlet 40a. Alternatively, at least part of each of the wide portion and the narrow portion may decrease in width with increasing distance from the inlet 40a.

In the present embodiment, the entire first layer 41 is located within the outer edges of the second layer 42 when viewed in the Z direction. The core 40 includes a single-layered portion in which the second layer 42 is not present when viewed in the Z direction, and a two-layered portion in which the second layer 42 and part of the first layer 41 are present when viewed in the Z direction.

An example of the shape of the plasmon generator 23 will now be described with reference to FIG. 4. The plasmon generator 23 has a near-field light generating surface 23a located in the medium facing surface 80a, a plasmon exciting section 23b serving as a bottom surface, a top surface 23c, a rear end face 23d located opposite to the near-field light generating surface 23a, and two side surfaces. The near-field light generating surface 23a is located between the end face of the main pole 27 and the front end face 42b of the second layer 42. The near-field light generating surface 23a generates near-field light on the principle to be described later. The plasmon exciting section 23b is located at a predetermined distance from the top surface 42d of the second layer 42 of the core 40 and faces the top surface 42d. The cladding layer 22 is interposed between the top surface 42d of the second layer 42 and the plasmon exciting section 23b. For example, the plasmon generator 23 is generally rectangular in cross section parallel to the medium facing surface 80a. The thickness (the dimension in the Z direction)

of the plasmon generator 23 is substantially constant regardless of distance from the medium facing surface 80a.

Although not illustrated, the plasmon generator 23 may include a narrow portion located in the vicinity of the medium facing surface 80a, and a wide portion which is located farther from the medium facing surface 80a than is the narrow portion. The width of the narrow portion may be constant regardless of distance from the medium facing surface 80a, or may decrease with decreasing distance to the medium facing surface 80a. The wide portion is located on a side of the narrow portion opposite from the near-field light generating surface 23a, and is coupled to the narrow portion. The wide portion has an equal width to the width of the narrow portion at the position of boundary between the wide portion and the narrow portion, and has a greater width than the width of the narrow portion at other positions.

The width of the near-field light generating surface 23a is defined by the width of the narrow portion in the medium facing surface 80a. The width of the near-field light generating surface 23a falls within the range of 5 to 40 nm, for example. The height (the dimension in the Z direction) of the near-field light generating surface 23a is defined by the height of the narrow portion in the medium facing surface 80a. The height of the near-field light generating surface 23a falls within the range of 5 to 40 nm, for example.

Now, the principle of generation of near-field light in the present embodiment and the principle of thermally-assisted magnetic recording using near-field light will be described in detail. Laser light emitted from the exit portion 112a of the laser diode 110 enters the core 40 through the inlet 40a. The laser light propagates through the two-layered portion and the single-layered portion of the core 40 sequentially, and reaches the vicinity of the plasmon generator 23. The top surface 42d of the second layer 42 generates evanescent light from the laser light propagating through the core 40. More specifically, the laser light is totally reflected at the top surface 42d of the second layer 42, and this causes the top surface 42d of the second layer 42 to generate evanescent light that permeates into the cladding layer 22. In the plasmon generator 23, surface plasmons are excited on the plasmon exciting section 23b through coupling with the aforementioned evanescent light. The excited surface plasmons propagate to the near-field light generating surface 23a, and the near-field light generating surface 23a generates near-field light from those surface plasmons.

The near-field light generated at the near-field light generating surface 23a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 27 for data writing.

A manufacturing method for the thermally-assisted magnetic recording head of the present embodiment will now be described with reference to FIG. 5 and FIG. 6. The manufacturing method for the thermally-assisted magnetic recording head includes the step of fabricating a plurality of sliders 100 and the step of bonding the support member 120 with the laser diode 110 mounted thereon to each of the plurality of sliders 100. The step of fabricating a plurality of sliders 100 includes the steps of: forming components of the plurality of sliders 100, except the substrates 1, on a single wafer including portions to become the substrates 1 of the plurality of sliders 100, thereby fabricating a substructure including pre-slider portions arranged in a plurality of rows, the pre-slider portions becoming individual sliders 100 later; and cutting the substructure to separate the pre-slider portions from each other and forming the medium facing surface 80 and the rear surface 80b for each of the pre-slider portions (this step will be referred to as the step of forming the medium facing surface 80a and the rear surface 80b). The plurality of sliders 100 are fabricated in this manner.

The step of fabricating the sliders 100 of the present embodiment will be described in more detail below with attention focused on a single slider 100. In this step, first, the insulating layer 2 is formed on the substrate 1. The bottom shield layer 3 is then formed on the insulating layer 2. Then, the insulating layer 4 is formed to cover the bottom shield layer 3. The insulating layer 4 is then polished by, for example, chemical mechanical polishing (hereinafter referred to as CMP), until the bottom shield layer 3 is exposed.

Then, the bottom shield gap film 5 is formed over the bottom shield layer 3 and the insulating layer 4. On the bottom shield gap film 5, the MR element 6 and two leads (not illustrated) connected to the MR element 6 are formed. Next, the top shield gap film 7 is formed to cover the MR element 6 and the leads. The top shield layer 8 is then formed on the top shield gap film 7. Then, the insulating layer 9 is formed to cover the top shield layer 8. The insulating layer 9 is then polished by, for example, CMP, until the top shield layer 8 is exposed.

Then, the nonmagnetic layer 10 is formed over the top shield layer 8 and the insulating layer 9. The return pole layer 11 is then formed on the nonmagnetic layer 10. Then, the insulating layer 12 is formed to cover the return pole layer 11. The insulating layer 12 is then polished by, for example, CMP, until the return pole layer 11 is exposed. Then, the insulating layer 14 is formed over the return pole layer 11 and the insulating layer 12.

The insulating layer 14 is then selectively etched to form therein two openings for exposing the top surface of the return pole layer 11. Then, the first layers of the coupling sections 13A and 13B are formed on the return pole layer 11 at the positions of the two openings. The coil 15 is then formed on the insulating layer 14. The insulating layer 16 is then formed in the space between every adjacent turns of the coil 15. Then, the insulating layer 17 is formed over the entire top surface of the layered structure. The insulating layer 17 is then polished by, for example, CMP, until the first layers of the coupling sections 13A and 13B, the coil 15, and the insulating layer 16 are exposed. The insulating layer 18 is then formed over the first layers of the coupling sections 13A and 13B, the coil 15, and the insulating layers 16 and 17.

The insulating layer 18 is then selectively etched to form therein two openings for exposing the top surfaces of the first layers of the coupling sections 13A and 13B. The second layers of the coupling sections 13A and 13B are then formed on the first layers of the coupling sections 13A and 13B.

The step of forming the first layer 41 of the core 40 will be described below with reference to FIGS. 7A to 21B. The following description includes a description of the manufacturing method for the waveguide according to the present embodiment. FIGS. 7A to 21B each show a cross section of a layered structure formed in the process of manufacturing the slider 100. Fig. nA (n is an integer between 7 and 21 inclusive) shows a cross section that is perpendicular to the medium facing surface 80a and to the top surface 1a of the substrate 1. Fig. nB shows a cross section that is parallel to the medium facing surface 80a and corresponds to a position crossing the front end 41A of the first layer 41 of the core 40. In Figs. nA and nB, the components of the slider 100 are schematically shown to facilitate understanding. Figs. nA and nB omit the illustration of portions that are located on the substrate-1 side relative to the cladding layer 19.

Figure 7A:
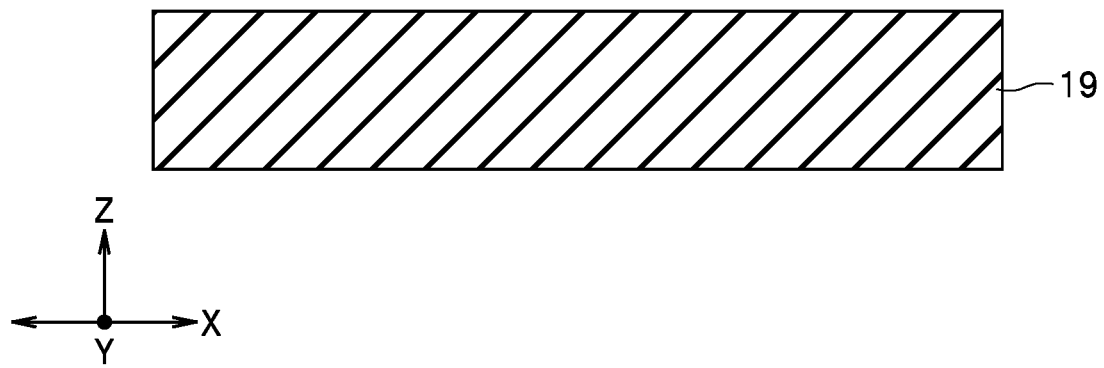
FIGS. 7A and 7B are cross-sectional views showing a step of a manufacturing method for the waveguide according to the first embodiment of the invention.
Figure 7B:
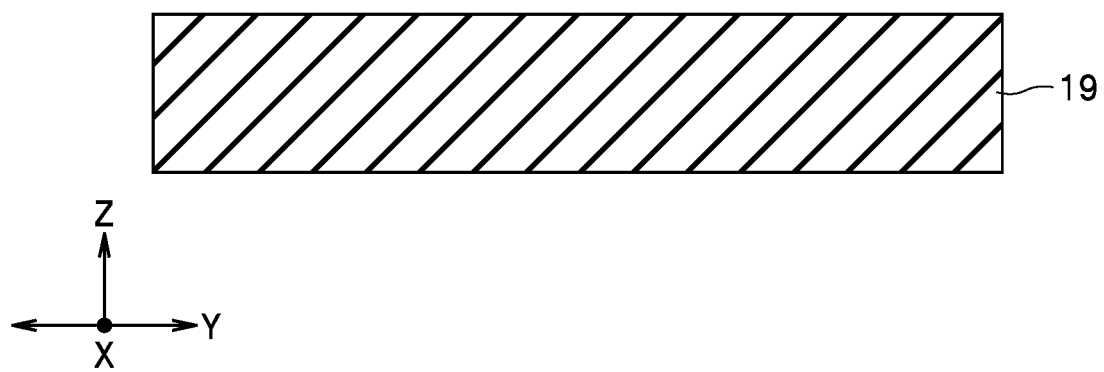

FIGS. 7A and 7B show a step following the formation of the second layers of the coupling sections 13A and 13B. In this step, first, the cladding layer 19 is formed to cover the second layers of the coupling sections 13A and 13B. For example, the cladding layer 19 is formed by using physical vapor deposition (hereinafter, referred to as PVD) or chemical vapor deposition (hereinafter, referred to as CVD). The cladding layer 19 is formed so that the thickness of the cladding layer 19 is greater than the maximum thickness of the first layer 41 of the core 40 to be formed later. The cladding layer 19 is then polished by, for example, CMP, until the second layers of the coupling sections 13A and 13B are exposed.

Figure 8A:
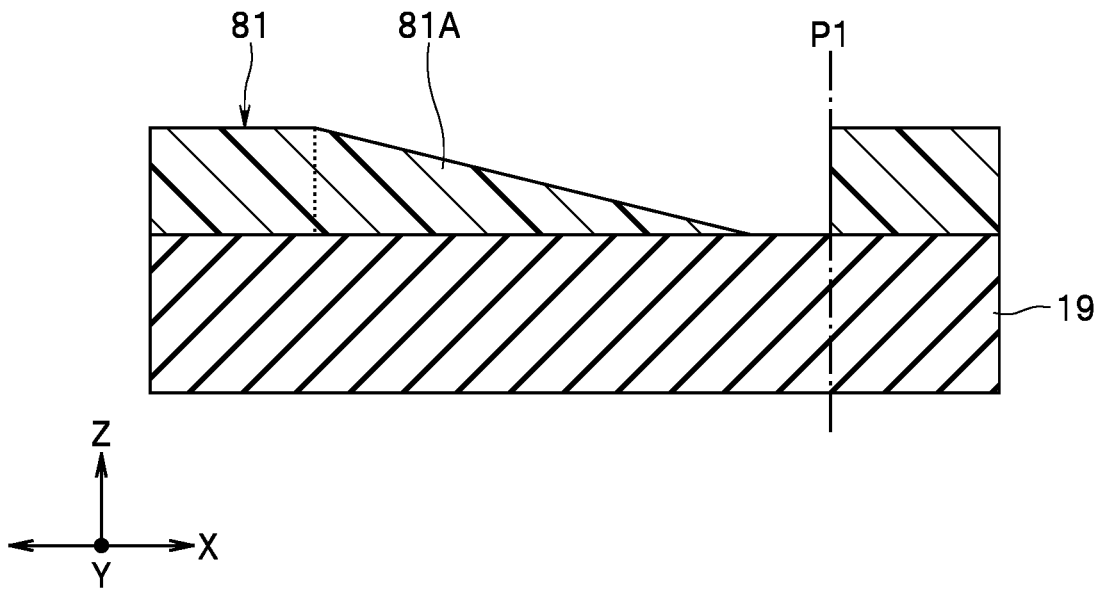
FIGS. 8A and 8B are cross-sectional views showing a step that follows the step shown in FIGS. 7A and 7B.
Figure 8B:
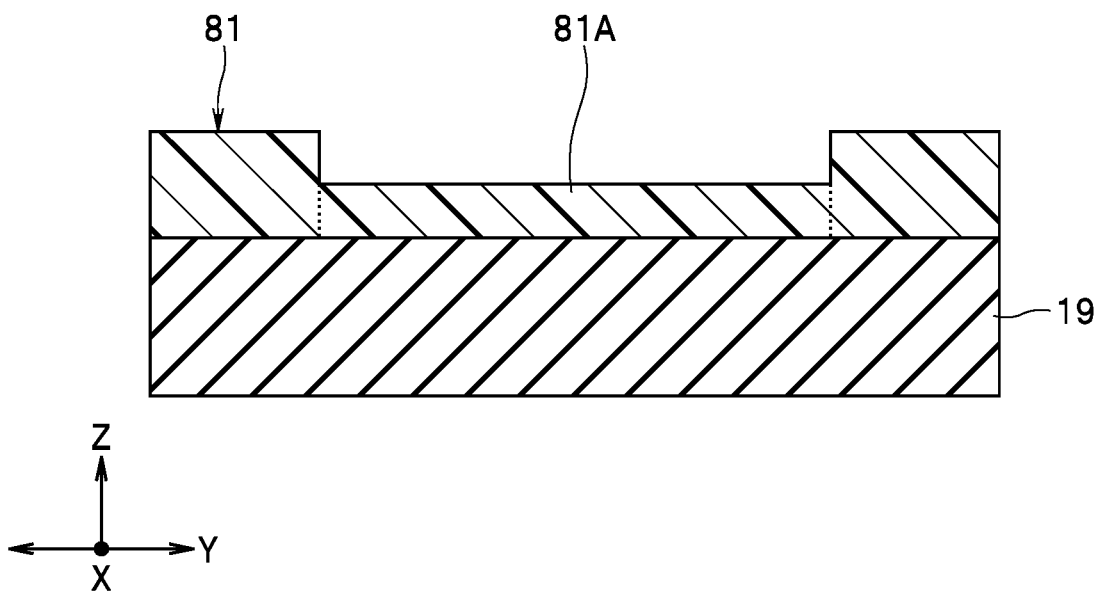

FIGS. 8A and 8B show the next step. In this step, a photoresist mask 81 is formed on the cladding layer 19. The photoresist mask 81 is formed in the following manner. A photoresist layer is initially formed over the entire top surface of the layered structure. Next, the photoresist layer is selectively exposed by using a photomask. Next, the exposed photoresist layer is developed. The photoresist layer remaining after the development makes the photoresist mask 81.

In FIG. 8A, the straight line denoted by the symbol P1 indicates the position at which the inlet 40a of the core 40 is to be formed. The photoresist mask 81 includes a thickness changing portion 81A that increases in thickness with increasing distance from the position P1 at which the inlet 40a is to be formed. In FIGS. 8A and 8B, the borders between the thickness changing portion 81A and the other portions are indicated by dotted lines. The thickness changing portion 81A has a planar shape (shape viewed in the Z direction) greater than that of the first layer 41 of the core 40 to be formed later. The dimension of the thickness changing portion 81A in the X direction falls within, for example, the range of 50 to 120 μm.

Figure 22:
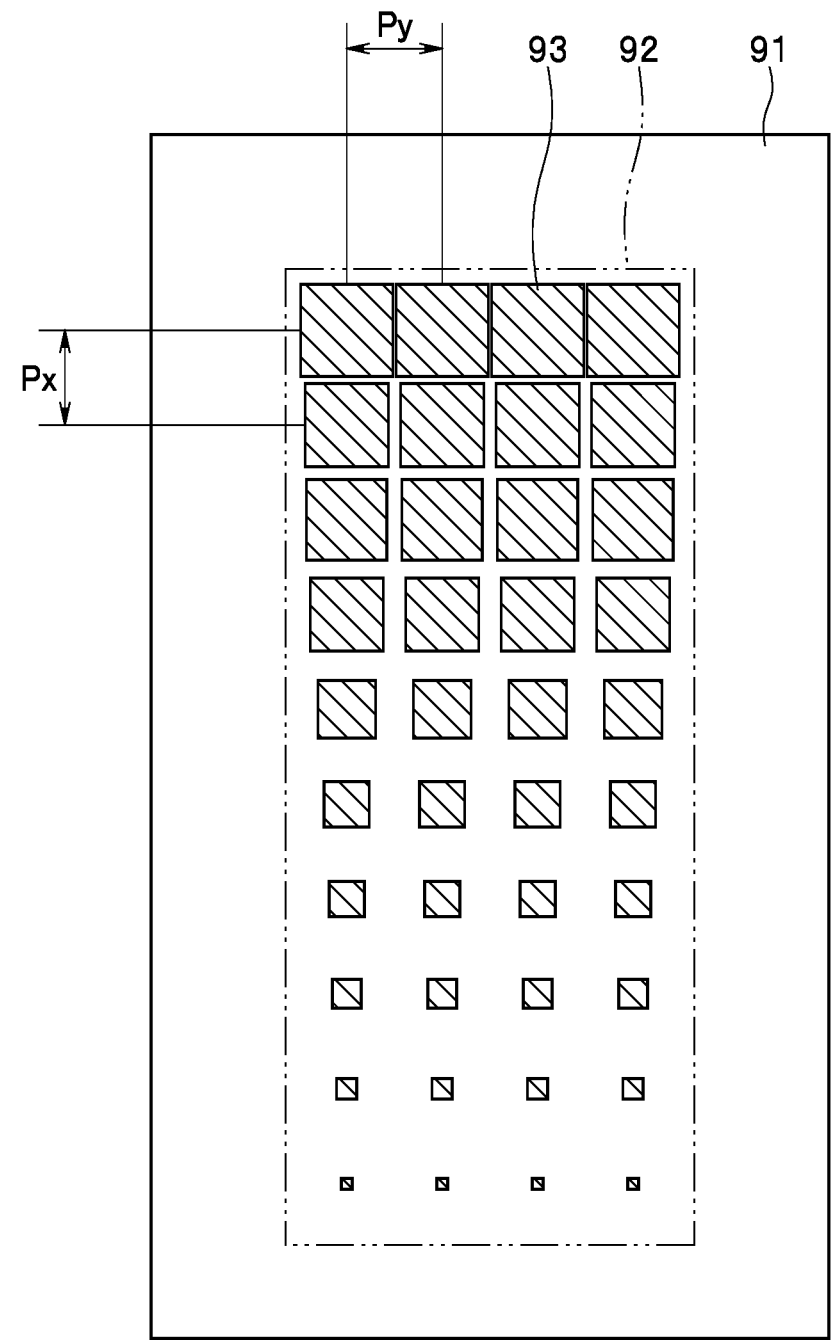
FIG. 22 is a plan view showing a photomask used in the step shown in FIGS. 8A and 8B.
Figure 22:
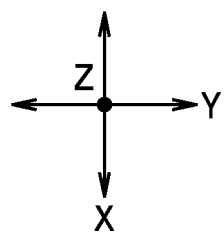

As described above, the photoresist mask 81 is formed by patterning the photoresist layer using the photomask. FIG. 22 shows a photomask 91 used in forming the photoresist mask 81. The photomask 91 includes a transmittance changing area 92 that changes in transmittance with increasing distance from the position P1 at which the inlet 40a is to be formed. The transmittance changing area 92 has a planar shape corresponding to that of the thickness changing portion 81A.

The transmittance changing area 92 includes a plurality of graphic patterns 93. The plurality of graphic patterns 93 can each have, for example, a rectangular shape. Each of the graphic patterns 93 may be a light transmitting portion or a light shielding portion. If each of the graphic patterns 93 is a light transmitting portion, the portion around the plurality of graphic patterns 93 is a light shielding portion. If each of the graphic patterns 93 is a light shielding portion, the portion around the plurality of graphic patterns 93 is a light transmitting portion. Whether to configure each of the graphic patterns 93 as a light transmitting portion or a light shielding portion is selected based on whether the photoresist layer is a positive type or a negative type.

In FIG. 22, the position of the upper end of the transmittance changing area 92 in FIG. 22 corresponds to the position P1 at which the inlet 40a is to be formed. The plurality of graphic patterns 93 decreases in size with increasing distance from the position P1 at which the inlet 40a is to be formed. Thus, the transmittance of the transmittance changing area 92 changes with increasing distance from the position P1 at which the inlet 40a is to be formed. The plurality of graphic patterns 93 each have a size less than or equal to the photolithographic resolution.

Now, attention is placed on adjoining two of the plurality of graphic patterns 93. As shown in FIG. 22, a pitch between the centers of two graphic patterns 93 in the X direction will be denoted by the symbol Px, and a pitch between the centers of two graphic patterns 93 in the Y direction will be denoted by the symbol Py. Both the pitches Px and Py are less than or equal to the photolithographic resolution.

Figure 9A:
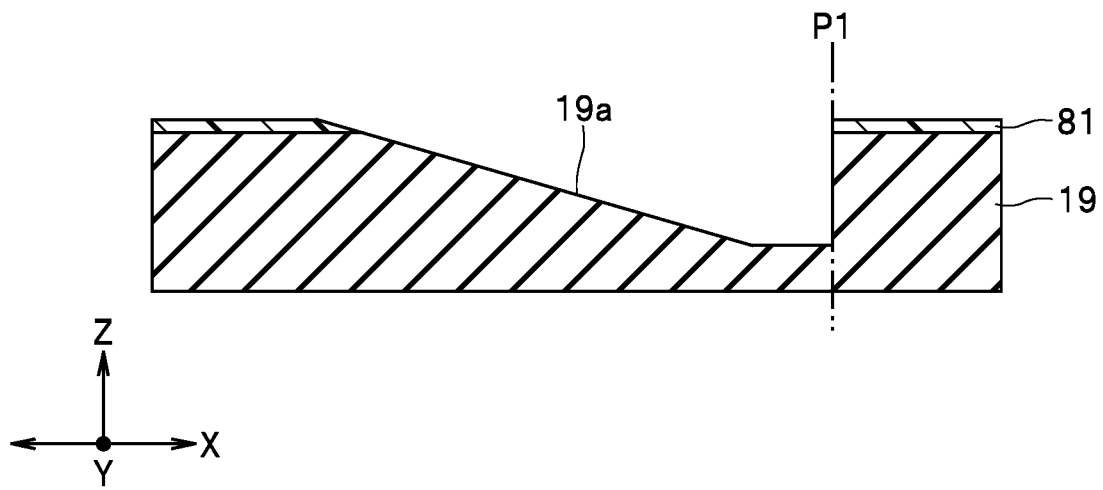
FIGS. 9A and 9B are cross-sectional views showing a step that follows the step shown in FIGS. 8A and 8B.
Figure 9B:
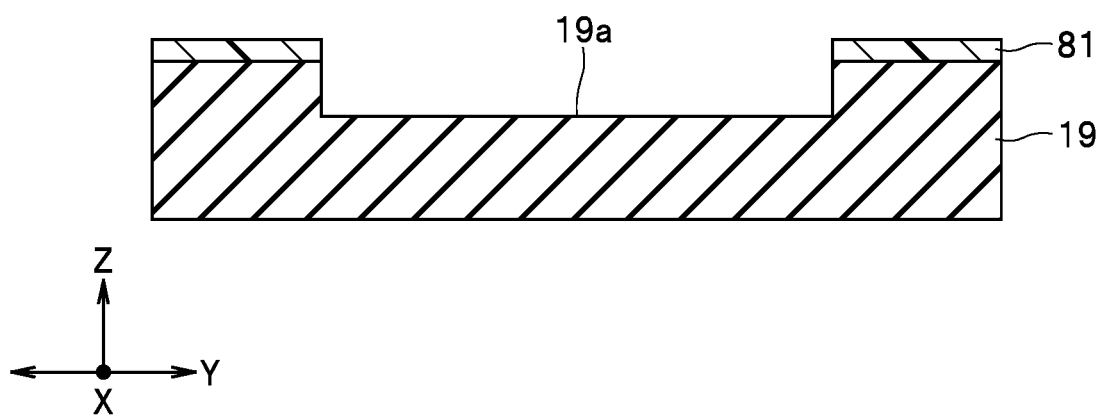

FIGS. 9A and 9B show the next step. In this step, the cladding layer 19 and the photoresist mask 81 are etched so that an accommodation portion 19a for accommodating the first layer 41 of the core 40 is formed in the cladding layer 19. This etching is performed by using, for example, ion beam etching (hereinafter, referred to as IBE).

Figure 10A:
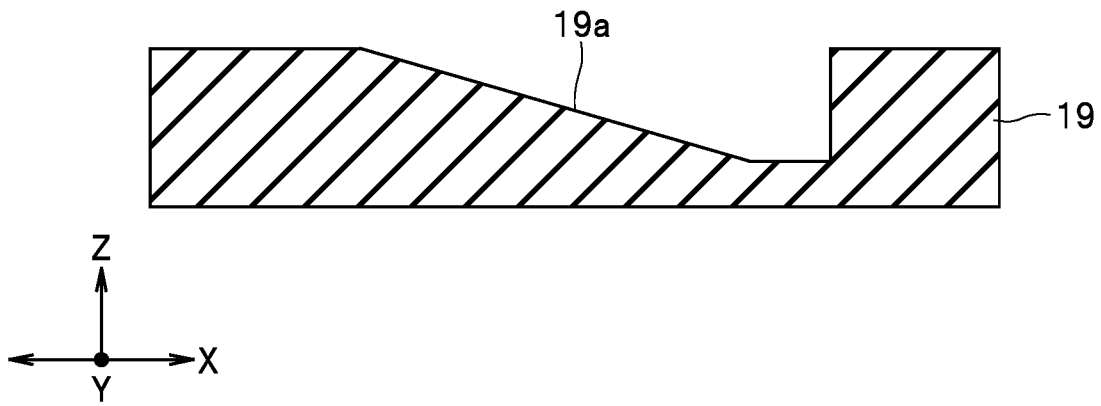
FIGS. 10A and 10B are cross-sectional views showing a step that follows the step shown in FIGS. 9A and 9B.
Figure 10B:
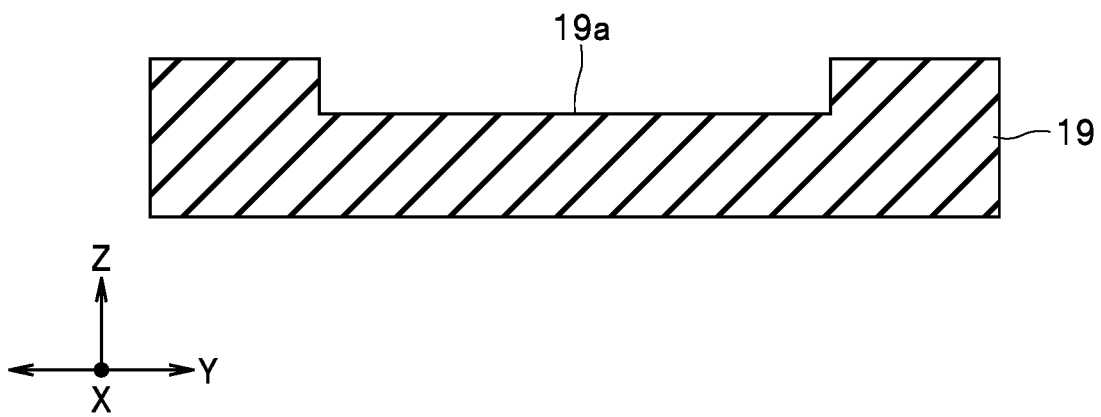

FIGS. 10A and 10B show the next step. In this step, the photoresist mask 81 is removed. The photoresist mask 81 may be removed by using at least one of of the following methods, wet etching, ashing, and reactive ion etching (hereinafter, referred to as RIE).

Figure 11A:
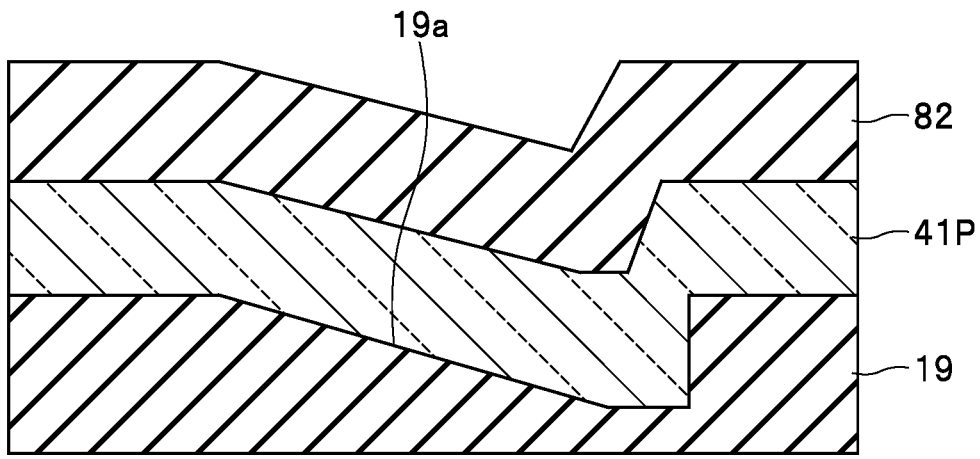
FIGS. 11A and 11B are cross-sectional views showing a step that follows the step shown in FIGS. 10A and 10B.
Figure 11B:
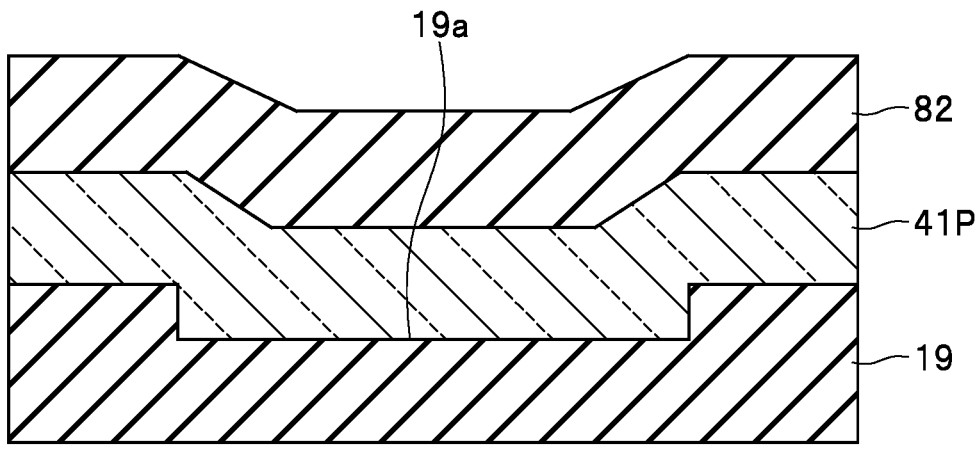

FIGS. 11A and 11B show the next step. In this step, a dielectric layer 41P to later become the first layer 41 of the core 40 is formed on the cladding layer 19. The dielectric layer 41P is formed to fill the accommodation portion 19a of the cladding layer 19. Next, a sacrifice layer 82 of a dielectric material different from that of the dielectric layer 41P is formed on the dielectric layer 41P. The sacrifice layer 82 is formed by using, for example, PVD or CVD. The material of the sacrifice layer 82 may be the same as that of the cladding layer 19.

Figure 12A:
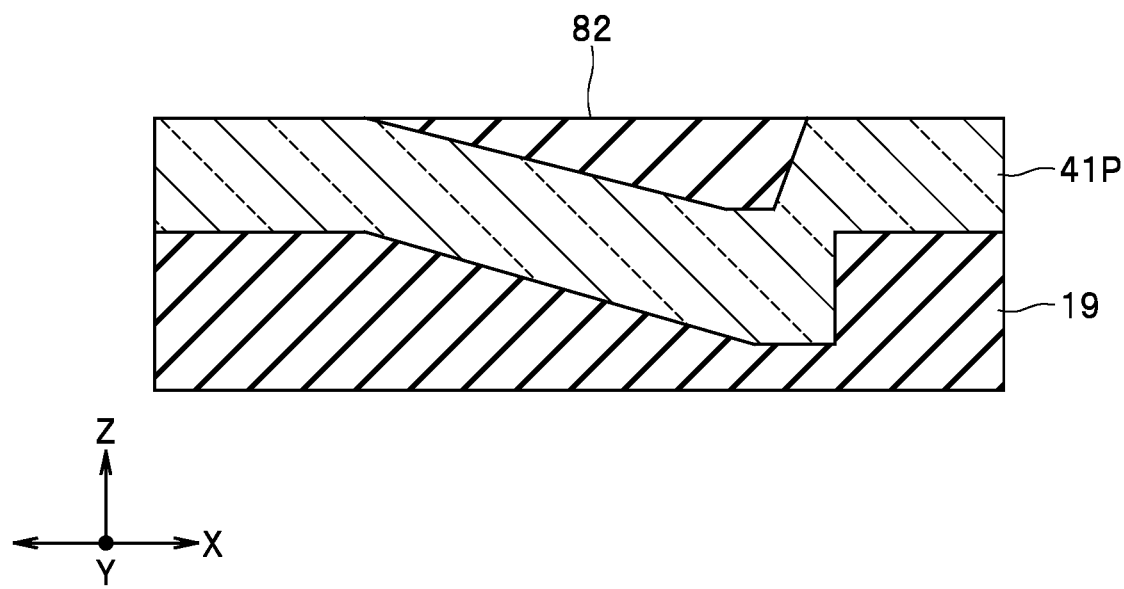
FIGS. 12A and 12B are cross-sectional views showing a step that follows the step shown in FIGS. 11A and 11B.
Figure 12B:
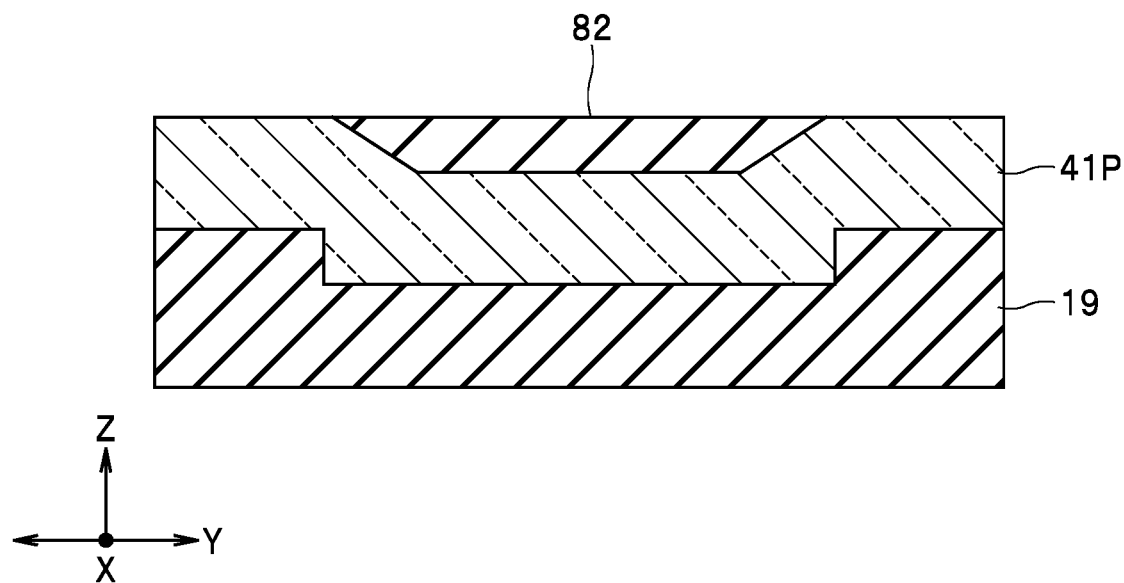

FIGS. 12A and 12B show the next step. In this step, the sacrifice layer 82 is polished by, for example, CMP until the dielectric layer 41P is exposed. The dielectric layer 41P functions as a polishing stopper for stopping the polishing if appropriate polishing conditions are selected.

Figure 13A:
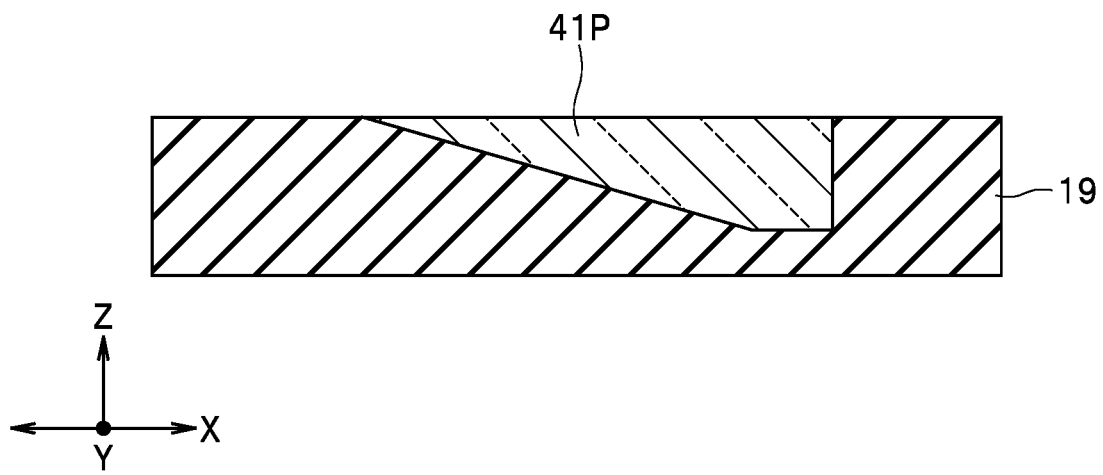
FIGS. 13A and 13B are cross-sectional views showing a step that follows the step shown in FIGS. 12A and 12B.
Figure 13B:
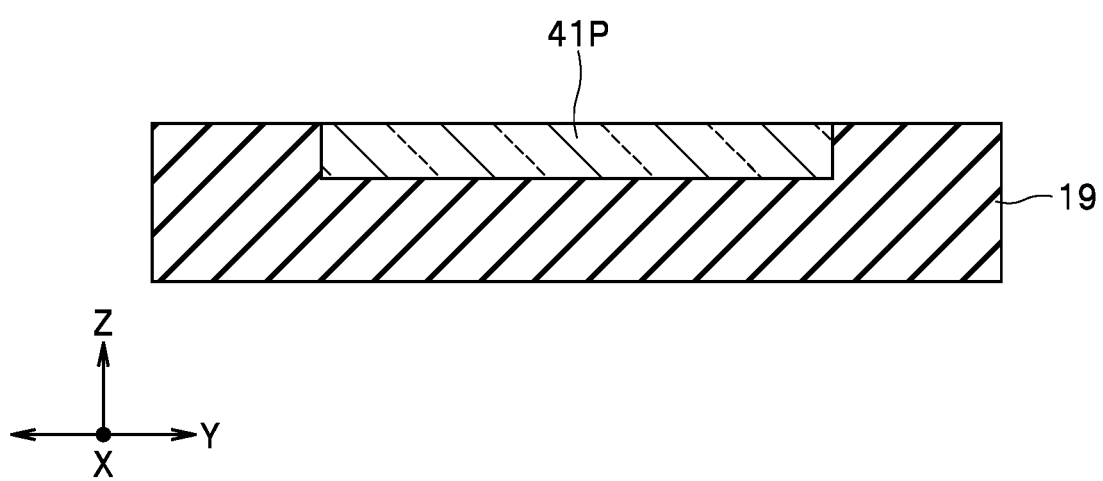

FIGS. 13A and 13B show the next step. In this step, the dielectric layer 41P and the sacrifice layer 82 are etched by, for example, IBE. This etching is performed until the maximum thickness of the dielectric layer 41P located in the accommodation portion 19a of the cladding layer 19 reaches a target thickness.

Figure 14A:
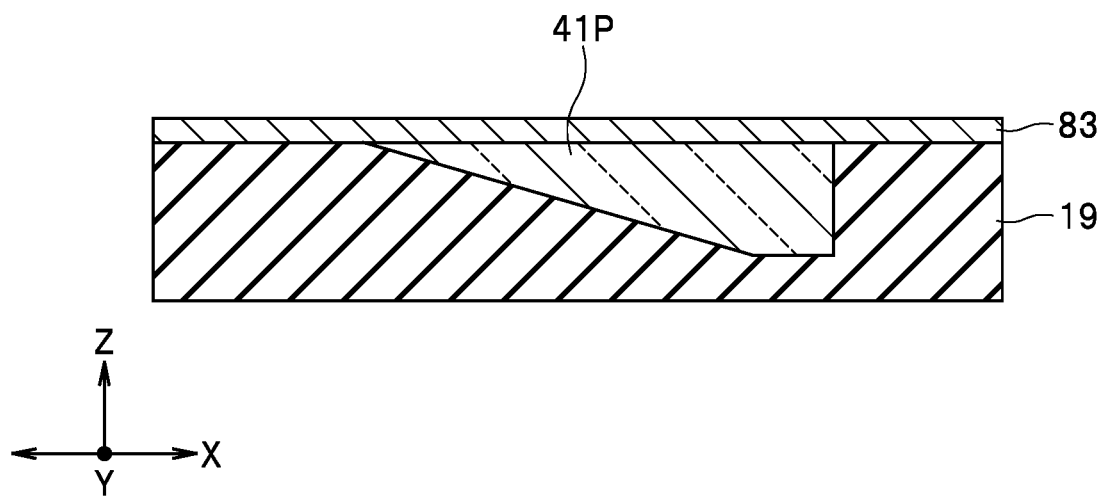
FIGS. 14A and 14B are cross-sectional views showing a step that follows the step shown in FIGS. 13A and 13B.
Figure 14B:
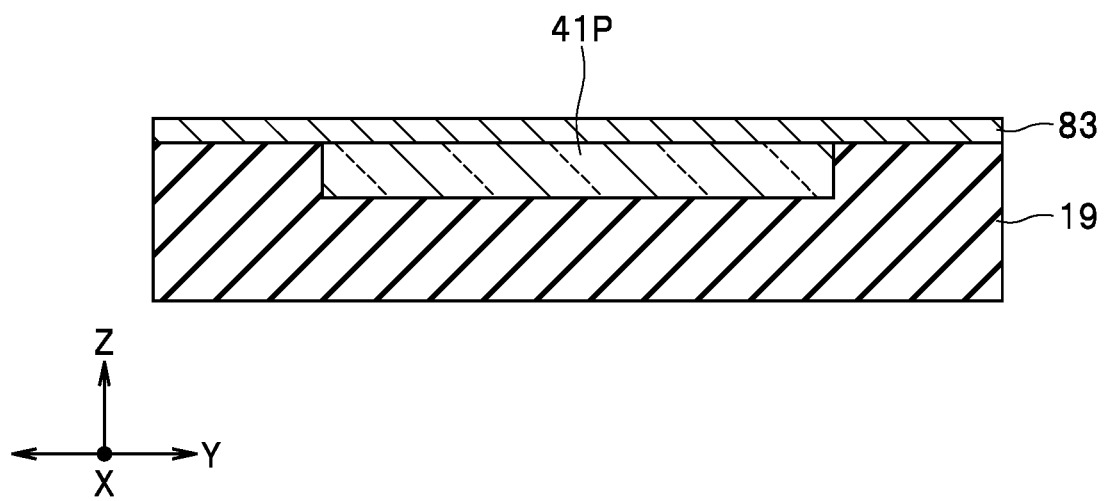

FIGS. 14A and 14B show the next step. In this step, a nonmagnetic metal layer 83 of a nonmagnetic metal material such as Ru, Ta, and NiCr is formed on the cladding layer 19 and the dielectric layer 41P.

Figure 15A:
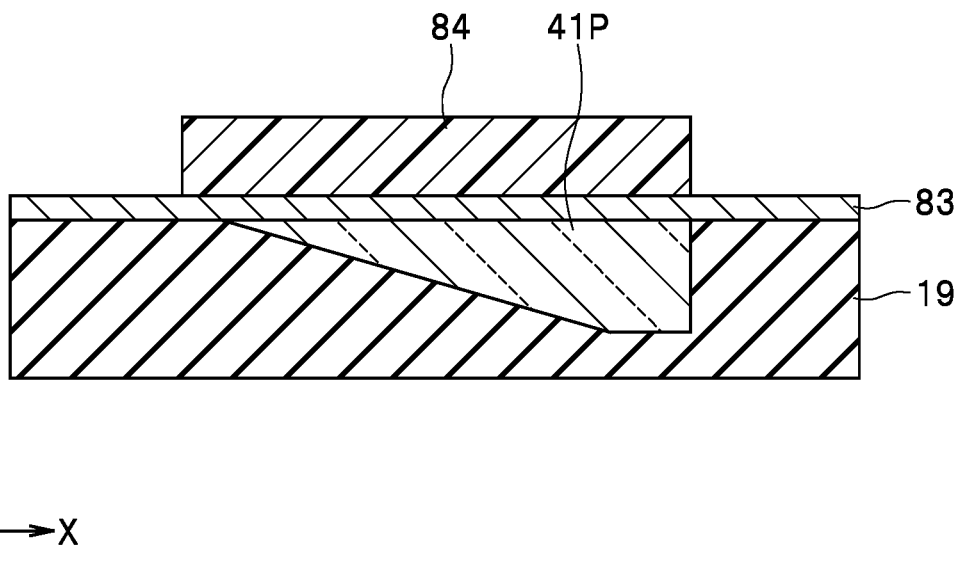
FIGS. 15A and 15B are cross-sectional views showing a step that follows the step shown in FIGS. 14A and 14B.
Figure 15B:
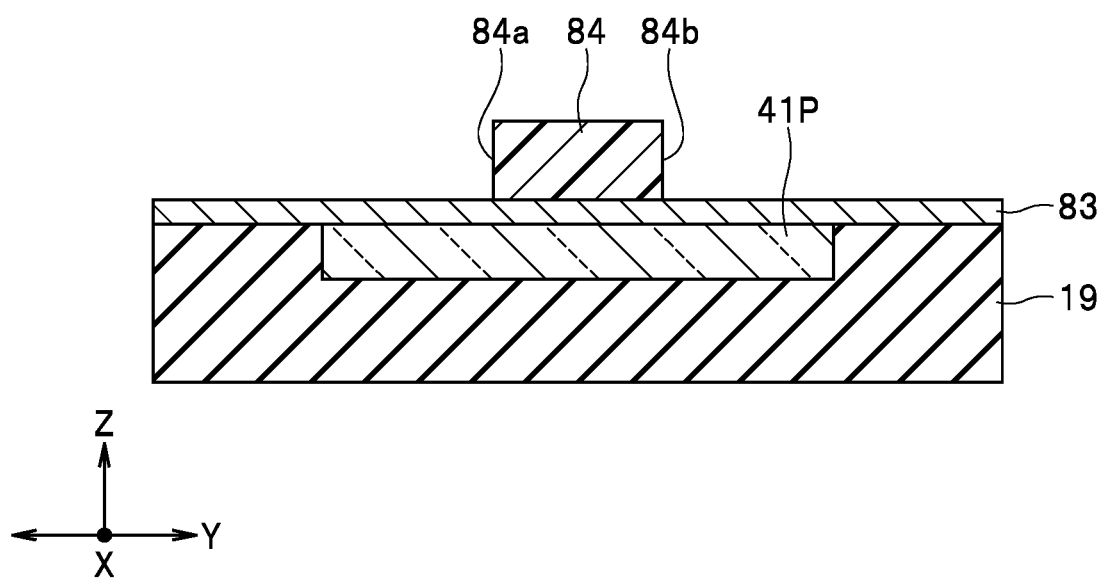

FIGS. 15A and 15B show the next step. In this step, a photoresist mask 84 is formed on the nonmagnetic metal layer 83. The photoresist mask 84 is formed by photolithographically patterning a photoresist layer. The photoresist mask 84 has a planar shape corresponding to that of the first layer 41 of the core 40. The photoresist mask 84 also has wall surfaces 84a and 84b for defining the positions of the first and second side surfaces 41e and 41f of the first layer 41 of the core 40.

Figure 16A:
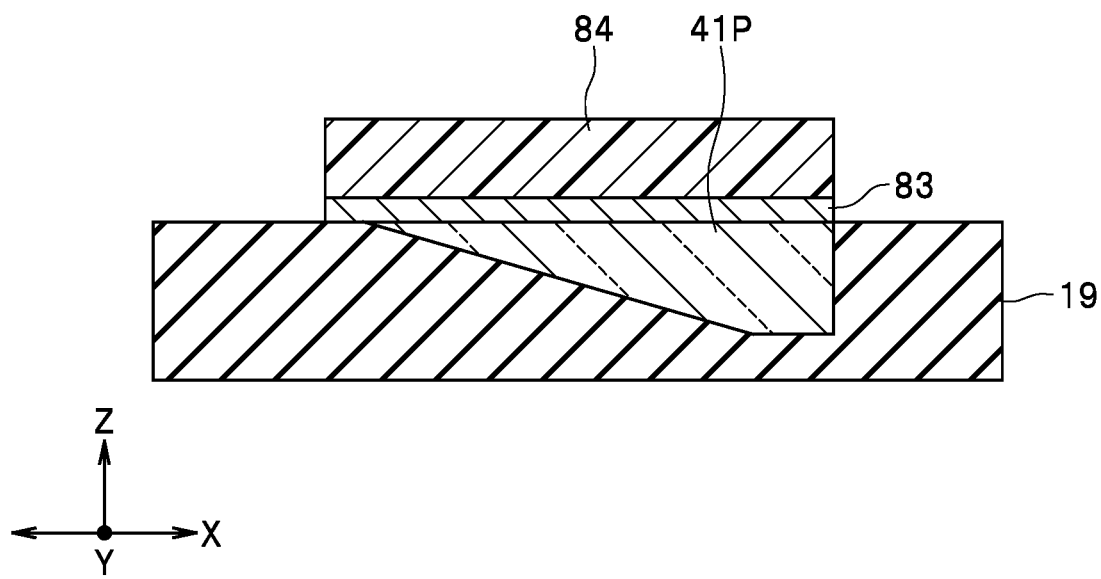
FIGS. 16A and 16B are cross-sectional views showing a step that follows the step shown in FIGS. 15A and 15B.
Figure 16B:
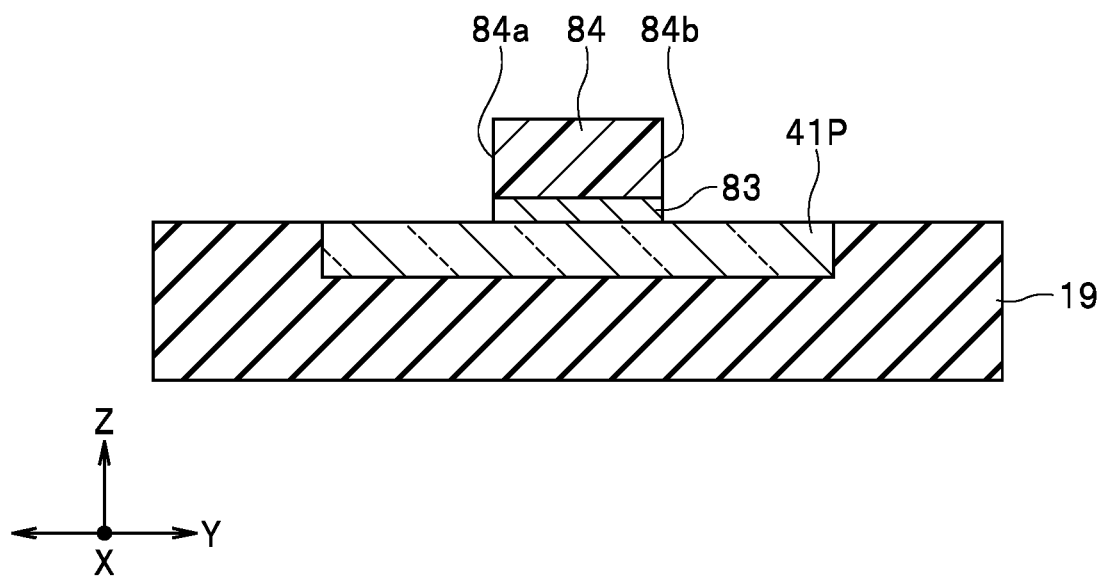

FIGS. 16A and 16B show the next step. In this step, portions of the nonmagnetic metal layer 83 other than portions located under the photoresist mask 84 are removed by, for example, IBE using the photoresist mask 84 as an etching mask.

Figure 17A:
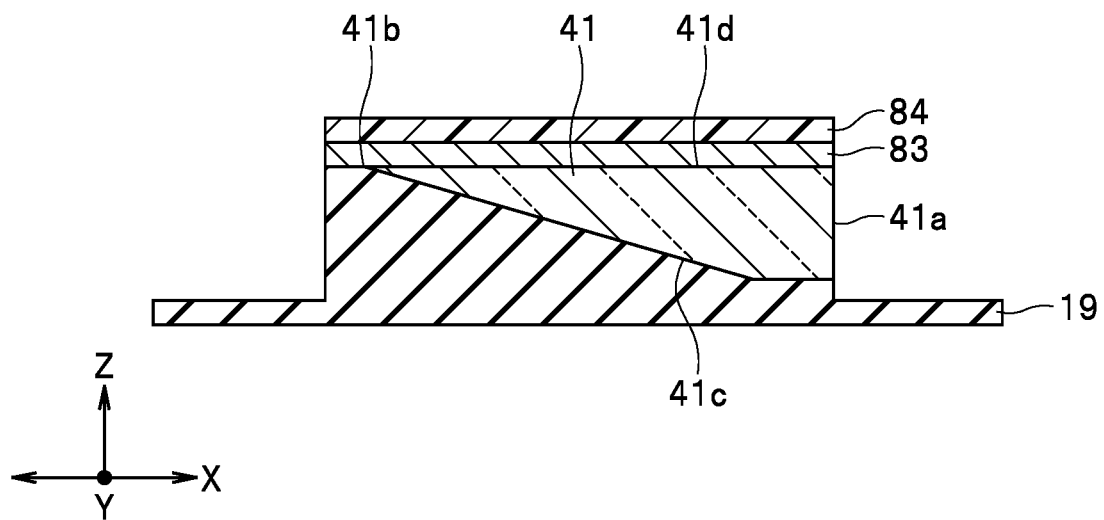
FIGS. 17A and 17B are cross-sectional views showing a step that follows the step shown in FIGS. 16A and 16B.
Figure 17B:
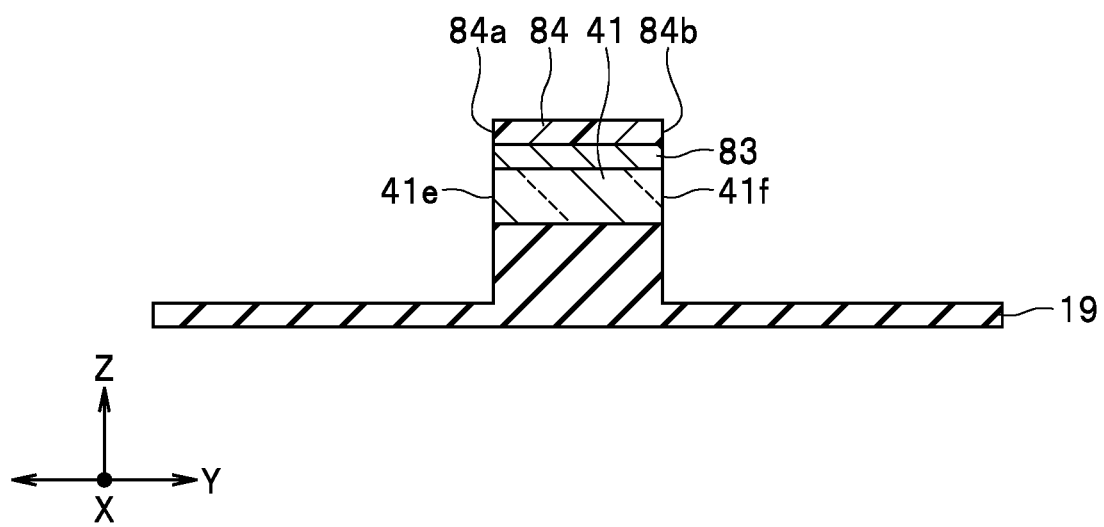

FIGS. 17A and 17B show the next step. In this step, the cladding layer 19 and the dielectric layer 41P are etched by, for example, RIE using the photoresist mask 84 and the nonmagnetic metal layer 83 as an etching mask. This etching makes the dielectric layer 41P into the first layer 41 of the core 40.

Figure 18A:
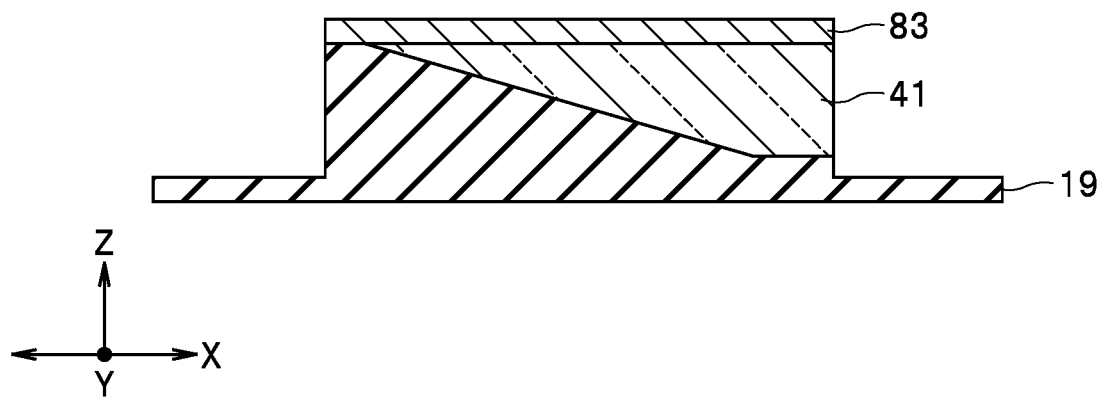
FIGS. 18A and 18B are cross-sectional views showing a step that follows the step shown in FIGS. 17A and 17B.
Figure 18B:
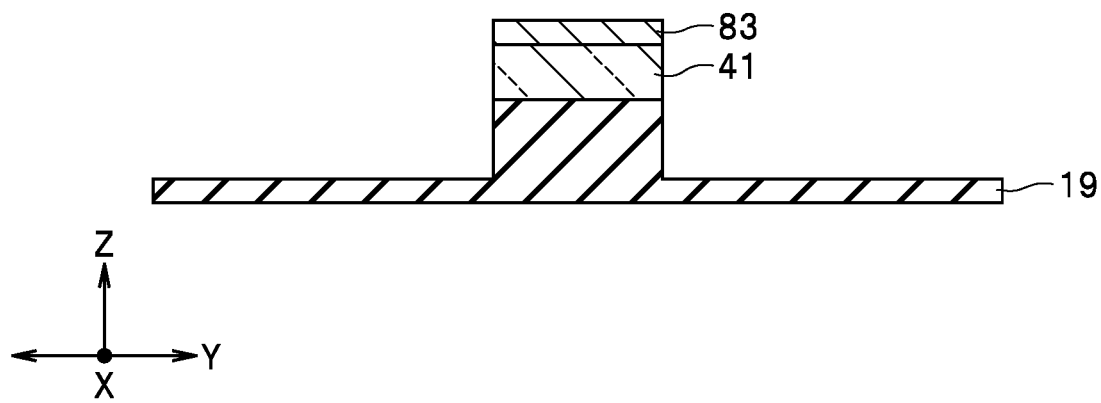

FIGS. 18A and 18B show the next step. In this step, the photoresist mask 84 is removed. The photoresist mask 84 may be removed by using wet etching and ultrasonic waves.

Figure 19A:
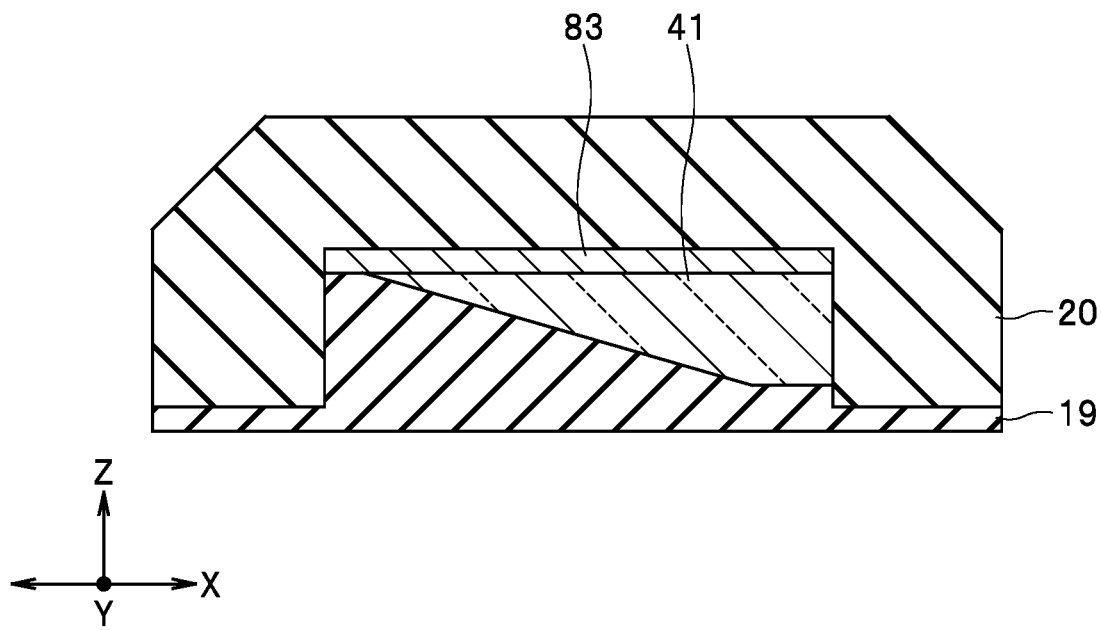
FIGS. 19A and 19B are cross-sectional views showing a step that follows the step shown in FIGS. 18A and 18B.
Figure 19B:
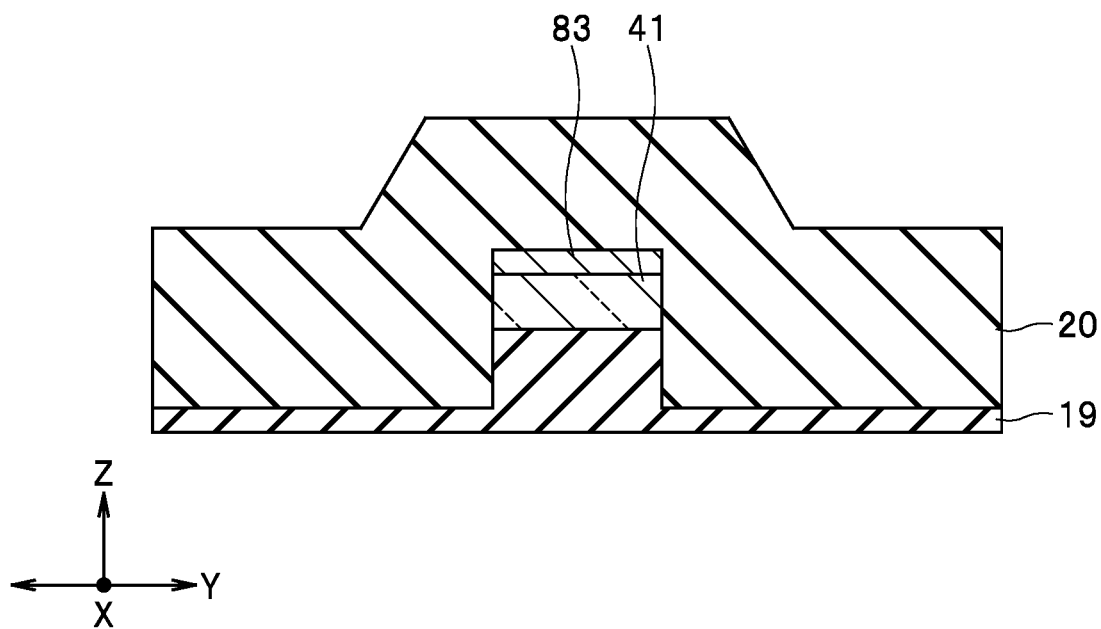

FIGS. 19A and 19B show the next step. In this step, the cladding layer 20 is formed over the entire surface of the layered structure.

Figure 20A:
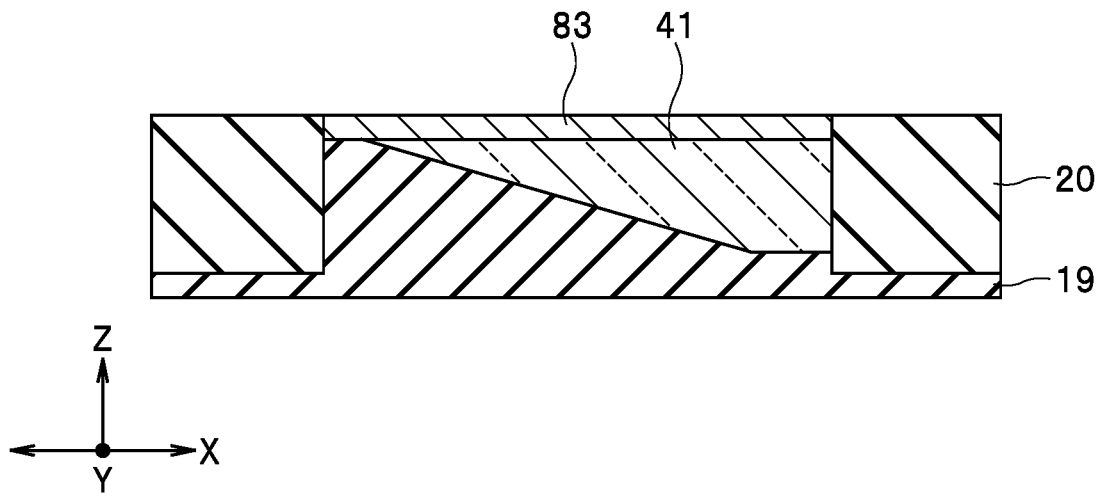
FIGS. 20A and 20B are cross-sectional views showing a step that follows the step shown in FIGS. 19A and 19B.
Figure 20B:
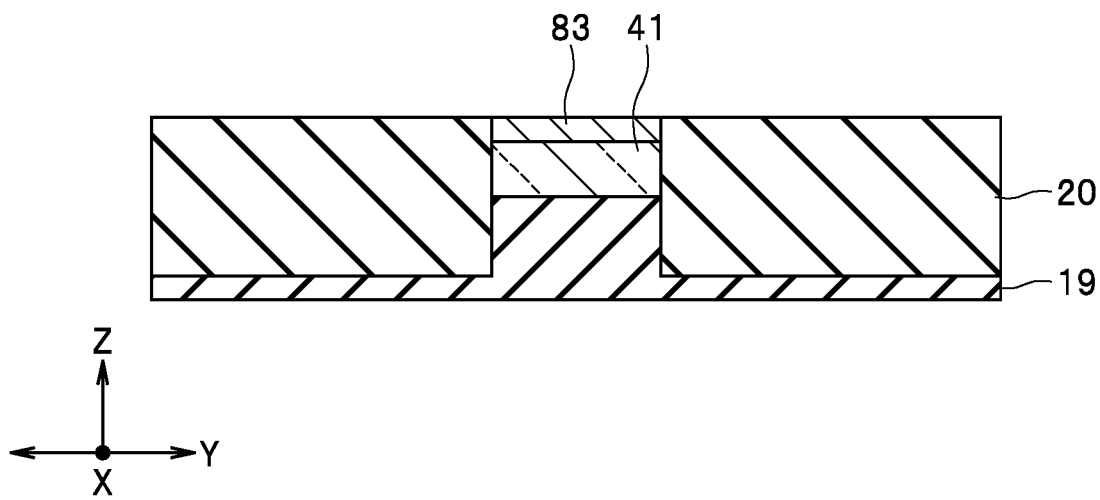

FIGS. 20A and 20B show the next step. In this step, the cladding layer 20 is polished by, for example, CMP. The nonmagnetic metal layer 83 functions as a polishing stopper for stopping the polishing.

Figure 21A:
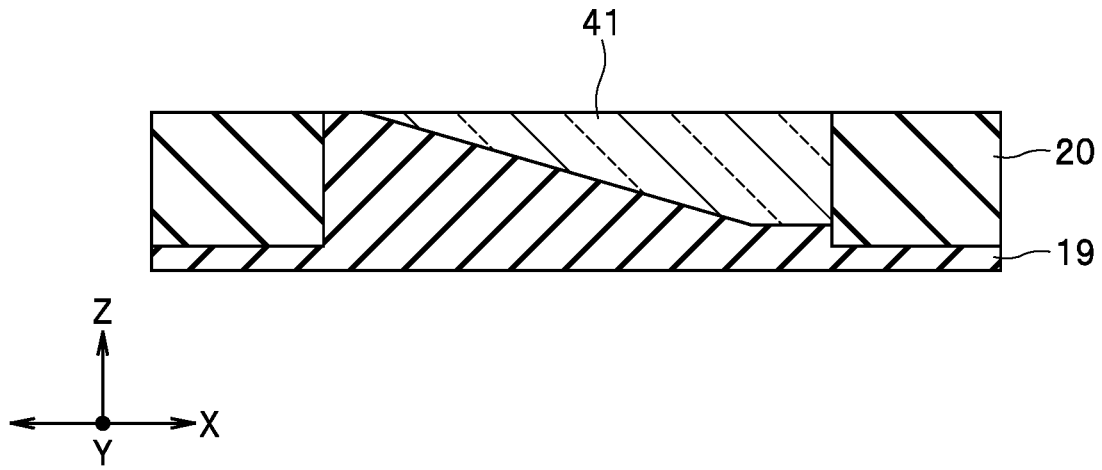
FIGS. 21A and 21B are cross-sectional views showing a step that follows the step shown in FIGS. 20A and 20B.
Figure 21B:
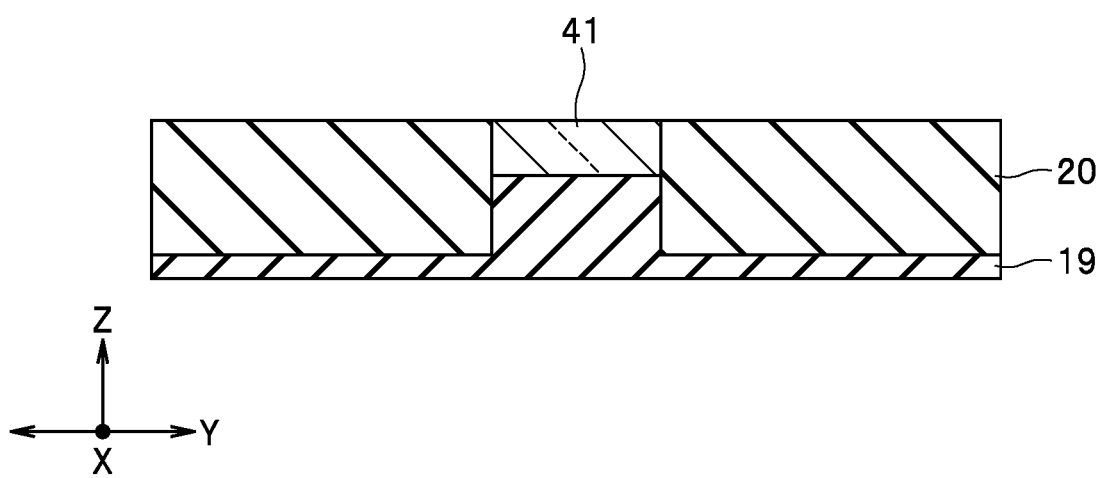

FIGS. 21A and 21B show the next step. In this step, the cladding layer 20 and the nonmagnetic metal layer 83 are etched to remove the nonmagnetic metal layer 83 by, for example, IBE. This etching may be performed until the top surfaces of the second layers of the respective coupling sections 13A and 13B are exposed.

The steps after the removal of the nonmagnetic metal layer 83 will be described below with reference to FIGS. 5 and 6. Initially, the second layer 42 of the core 40 is formed on the first layer 41 of the core 40 and the cladding layer 20. The second layer 42 of the core 40 is formed by photolithographically patterning a dielectric layer. The third layers of the coupling sections 13A and 13B are formed on the second layers of the respective coupling sections 13A and 13B. Next, the cladding layer 21 is formed over the entire top surface of the layered structure. Next, the cladding layer 21 is polished by, for example, CMP until the second layer 42 of the core 40 and the third layers of the respective coupling sections 13A and 13B are exposed. Next, the cladding layer 22 is formed over the entire top surface of the layered structure. The waveguide is thereby completed.

Next, the plasmon generator 23 is formed on the cladding layer 22. Next, the dielectric layer 24 is formed to cover the plasmon generator 23. The dielectric layer 24 is then polished by, for example, CMP, until the plasmon generator 23 is exposed. Then, the dielectric layer 25 is formed on the dielectric layer 24 and part of the plasmon generator 23. The dielectric layer 26 is then formed on the plasmon generator 23 and the dielectric layer 25.

Next, the cladding layer 22 and the dielectric layers 24 to 26 are selectively etched to form therein openings for exposing the top surfaces of the third layers of the coupling sections 13A and 13B. Then, the main pole 27 is formed on the dielectric layer 26, and the fourth layers of the coupling sections 13A and 13B are formed on the third layers of the coupling sections 13A and 13B. The dielectric layer 28 is then formed to cover the main pole 27 and the fourth layers of the coupling sections 13A and 13B. The dielectric layer 28 is then polished by, for example, CMP, until the main pole 27 and the fourth layers of the coupling sections 13A and 13B are exposed.

Next, the coil 29 is formed on the dielectric layer 28. Then, the insulating layer 30 is formed to cover the coil 29. The yoke layer 31 is then formed over the main pole 27, the fourth layers of the coupling sections 13A and 13B, the dielectric layer 28 and the insulating layer 30. The protective layer 32 is then formed to cover the yoke layer 31. Wiring, terminals, and other components are then formed on the top surface of the protective layer 32. When the substructure is completed thus, the step of forming the medium facing surface 80a and the rear surface 80b is performed. A protective film for covering the medium facing surface 80a may be formed thereafter. As a result of the formation of the medium facing surface 80a and the rear surface 80b, each pre-slider portion becomes a slider 100.

The step of forming the medium facing surface 80a and the rear surface 80b includes the steps of: polishing two surfaces of each pre-slider portion resulting from cutting the substructure; and forming a rail for allowing the slider to fly on one of the two polished surfaces that becomes the medium facing surface 80a.

As described above, the manufacturing method for the waveguide according to the present embodiment includes the step of forming the core 40 and the step of forming the cladding. The step of forming the cladding includes the step of forming the cladding layer 19 that is a part of the cladding and the step of forming the rest of the cladding. The step of forming the core 40 includes the step of forming the photoresist mask 81, including the thickness changing portion 81A that increases in thickness with increasing distance from the position P1 at which the inlet 40a is to be formed, on the cladding layer 19, the step of etching the cladding layer 19 and the photoresist mask 81 so that the accommodation portion 19a for accommodating the first layer 41 including the front portion 41A and the rear portion 41B is formed in the cladding layer 19, and the step of forming the first layer 41 including the front portion 41A and the rear portion 41B in the accommodation portion 19a.

According to the present embodiment, the accommodation portion 19a having a shape corresponding to the front portion 41A and the rear portion 41B can be formed by forming the photoresist mask 81. Therefore, according to the present embodiment, the front portion 41A that decreases in thickness with increasing distance from the inlet 40a (rear surface 80b) can thereby be formed.

Moreover, according to the present embodiment, the photoresist mask 81 can be formed by using the photomask 91 shown in FIG. 22.

Moreover, according to the present embodiment, the reliability of the waveguide can be enhanced and the manufacturing cost of the waveguide can be reduced. This effect will now be described through a comparison with a core of a waveguide of a comparative example.

Figure 23:
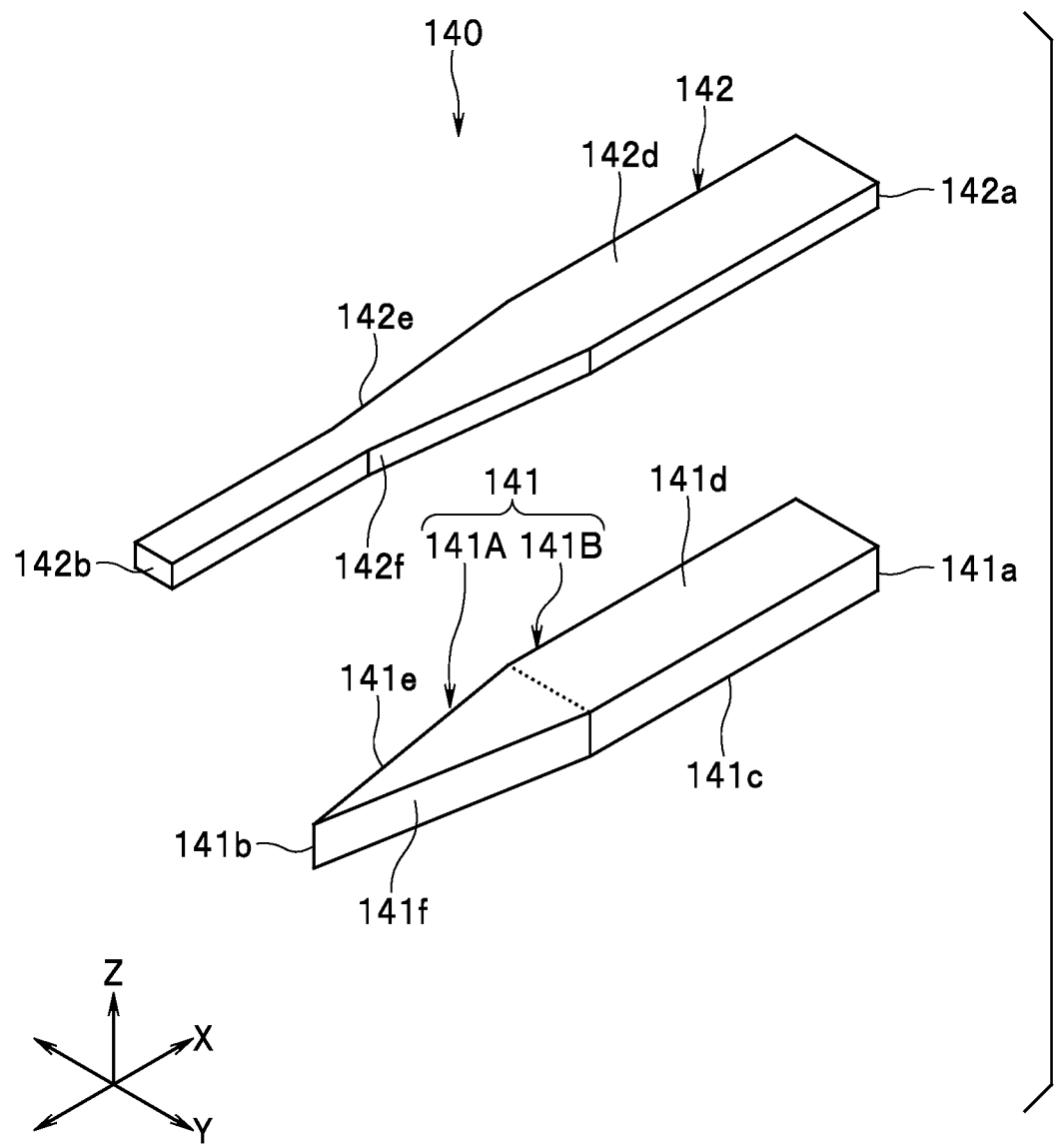
FIG. 23 is a perspective view showing a core of a waveguide of a comparative example.

A structure of the core of the waveguide of the comparative example will initially be described. FIG. 23 is a perspective view showing the core of the waveguide of the comparative example. The waveguide of the comparative example includes a core 140 instead of the core 40 of the present embodiment. The core 140 has an inlet. The core 140 includes a first layer 141 and a second layer 142 stacked in the Z direction.

The first layer 141 of the core 140 has a front end 141b farthest from the inlet of the core 140, a rear end 141a opposite the front end 141b, a bottom surface 141c and a top surface 141d located on opposite sides in the direction parallel to the Z direction, and a first side surface 141e and a second side surface 141f located on opposite sides in the Y direction. The rear end 141a constitutes a part of the inlet of the core 140. The first layer 141 includes a front portion 141A and a rear portion 141B located between the front portion 141A and the rear end 141a.

The front portion 141A has a thickness that is a dimension in the direction parallel to the Z direction and a width that is a dimension in the Y direction. The width of the front portion 141A decreases with increasing distance from the rear end 141a. The front end 141b of the first layer 141 is an edge formed by the first side surface 141e and the second side surface 141f intersecting with each other.

The front portion 141A has a constant thickness regardless of the distance from the rear end 141a.

The rear portion 141B has a thickness that is a dimension in the direction parallel to the Z direction and a width that is a dimension in the Y direction. Both the thickness and width of the rear position 141B are constant regardless of the distance from the rear end 141a.

The second layer 142 of the core 140 has a front end 142b farthest from the inlet of the core 140, a rear end 142a opposite the front end 142b, a bottom surface and a top surface 142d located on opposite sides in the direction parallel to the Z direction, and a first side surface 142e and a second side surface 142f located on opposite sides in the Y direction. The rear end 142a constitutes another part of the inlet of the core 140. The second layer 142 has the same shape as that of the second layer 42 of the core 40 of the present embodiment.

Next, a step of forming the first layer 141 of the core 140 will be described. In this step, a dielectric layer, which later becomes the first layer 141 of the core 140, is initially formed on the cladding layer 19. Next, a hard mask composed of a nonmagnetic metal material such as Ru, Ta, and NiCr is formed on the dielectric layer. The hard mask is formed by photolithographically patterning the nonmagnetic metal layer. The hard mask has a planar shape corresponding to that of the first layer 141. The nonmagnetic metal layer is patterned by using a first photoresist mask having a planar shape corresponding to that of the first layer 141. The first photoresist mask is removed by ashing or the like in the step of forming the hard mask.

Next, a second photoresist mask having a planar shape corresponding to that of the first layer 141 is formed on the hard mask. Next, the cladding layer 19 and the dielectric layer are etched by, for example, RIE, where the hard mask is used as an etching mask. This etching makes the dielectric layer into the first layer 141 of the core 140. The second photoresist mask is formed to stabilize the etching of the dielectric layer by RIE. Next, the second photoresist mask is removed. At this point in time, the front end 141b of the first layer 141 is exposed. As described above, the front end 141b of the first layer 141 is a sharp edge formed by the first side surface 141e and the second side surface 141f intersecting with each other. The second photoresist mask is therefore removed by wet etching and ashing without using ultrasonic waves so that the front end 141b of the first layer 141 is not broken. The subsequent steps are similar to those of forming the first layer 41 in the present embodiment.

As described above, in the comparative example, the second photoresist mask needs to be removed without the use of ultrasonic waves that can enhance the exfoliation efficiency of the photoresist mask. This, however, can result in residue due to the second photoresist mask.

By contrast, in the present embodiment, the first layer 41 can be formed without exposing the front end 41b of the first layer 41. Thus, in the present embodiment, ultrasonic waves can be used in the step of removing the photoresist mask 84 after the formation of the first layer 41. According to the present embodiment, the reliability can be enhanced by preventing the occurrence of residues.

To make the front end 141b of the first layer 141 sharp, the first and second photoresist masks need to be formed so that the portions corresponding to the front end 141b of the first layer 141 have a sharp planar shape. For that purpose, for example, high resolution photolithography using KrF excimer laser needs to be applied to the first and second photoresist masks. However, the high resolution photolithography contributes to increased cost.

By contrast, in the present embodiment, the planar shape of the front end 41b of the first layer 41 is not as sharp as that of the front end 141b of the first layer 141. Thus, according to the present embodiment, photolithography having lower resolution than in the comparative example can be used. According to the present embodiment, cost can thereby be reduced.

As described above, the angle that the bottom surface of the front portion 41A of the first layer 41 forms with respect to the X direction preferably falls within, for example, the range of 0.1° to 5°. Here, the angle that the bottom surface of the front portion 41A forms with respect to the X direction will be referred to as the inclination angle of the bottom surface of the front portion 41A. Now, a result of a simulation examining the effect of the inclination angle of the bottom surface of the front portion 41A on transmittance will be described. In the simulation, the transmittance of the core 40 was examined using the FDTD method while changing the inclination angle of the bottom surface of the front portion 41A to 2°, 3°, 5°, and 10°. In the simulation, the maximum thickness of the core 40 was 1.3 µm, and the minimum thickness of the core 40 was 0.5 µm. In the simulation, the transmittance of the core 140 of the waveguide of the comparative example was also examined.

As a result of the simulation, the transmittance at an inclination angle of 2° was 97.5%, the transmittance at an inclination angle of 3° was 95.8%, the transmittance at an inclination angle of 5° was 92.1%, and the transmittance at an inclination angle of 10° was 85.7%. This result shows that the transmittance increases as the inclination angle decreases. The core 140 of the waveguide of the comparative example showed a transmittance ranging from 92% to 95%. For the core 40 to have a transmittance higher than or equivalent to that of the core 140, the inclination angle of the bottom surface of the front portion 41A therefore preferably falls within the range of 0.1° to 5°.

Second Embodiment

Next, a manufacturing method for a waveguide according to a second embodiment of the present invention will be described. The manufacturing method for the waveguide according to the present embodiment is different from that of the first embodiment, concerning the step of forming the first layer 41 of the core 40. The step of forming the first layer 41 of the core 40 in the present embodiment will be described below. The following description of the core 40 formed in the process of manufacturing the slider 100 will be given as an example.

FIGS. 24A to 29B each show a cross section of a layered structure formed in the process of manufacturing the slider 100. Fig. nA (n is an integer between 24 and 29 inclusive) shows a cross section that is perpendicular to the medium facing surface 80a and to the top surface 1a of the substrate 1. Fig. nB shows a cross section that is parallel to the medium facing surface 80a and corresponds to a position crossing the front portion 41A of the first layer 41 of the core 40. In Figs. nA and nB, the components of the slider 100 are schematically shown to facilitate understanding. Figs. nA and nB omit the illustration of portions that are located on the substrate-1 side relative to the cladding layer 19.

Figure 24A:
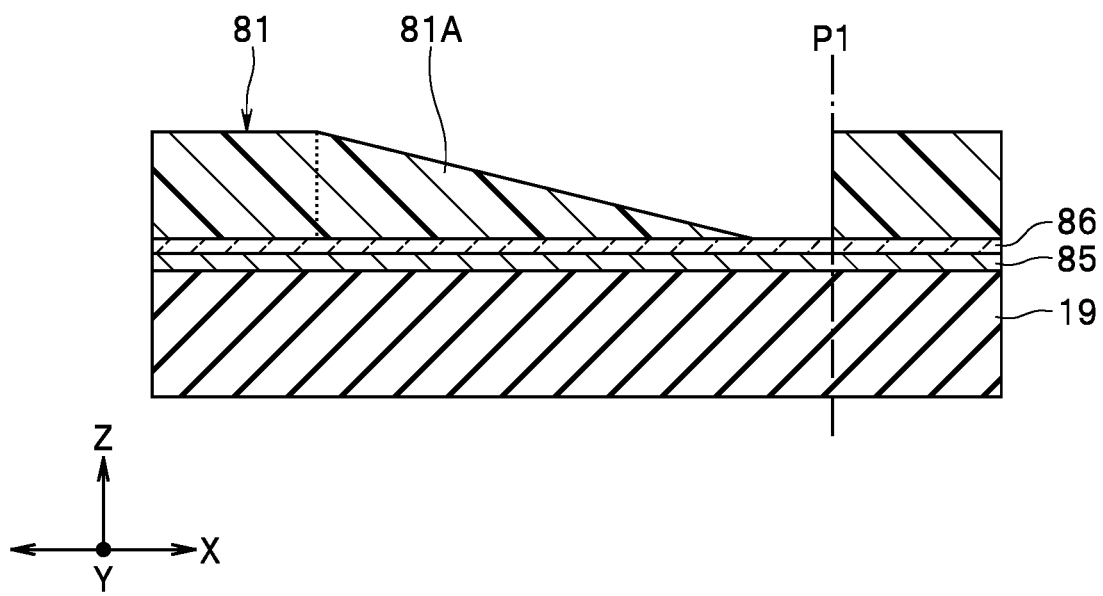
FIGS. 24A and 24B are cross-sectional views showing a step of a manufacturing method for a waveguide according to a second embodiment of the invention.
Figure 24B:
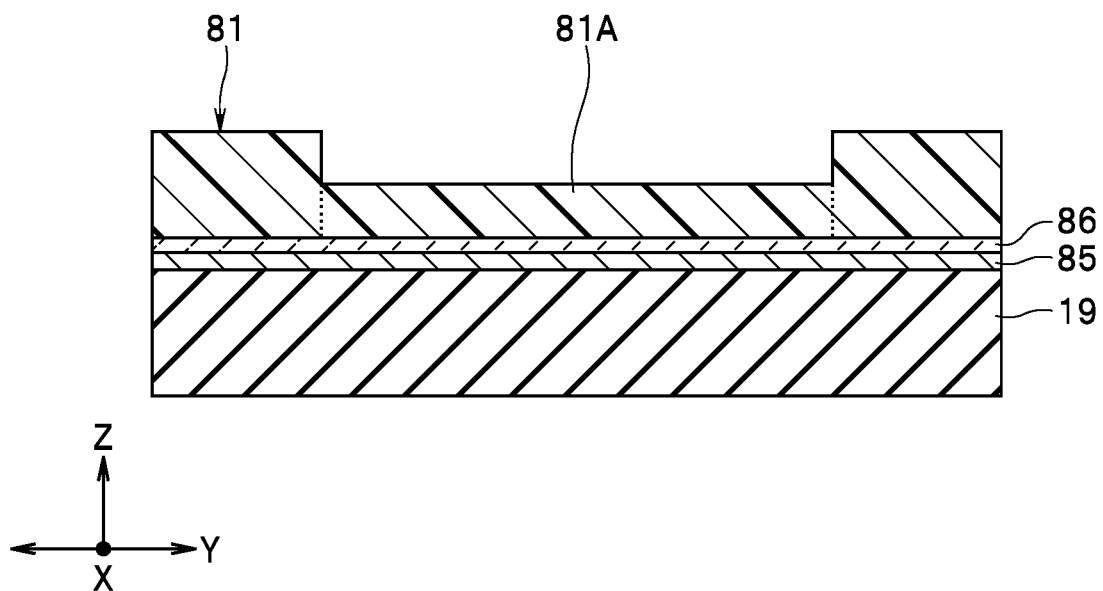

The manufacturing method is the same as that of the first embodiment up to the step of forming the cladding layer 19. FIGS. 24A and 24B show the step after the formation of the cladding layer 19. In this step, a nonmagnetic metal layer 85 composed of a nonmagnetic metal material such as Ru, Ta, and NiCr is initially formed on the cladding layer 19. Next, an anti-reflective coating (BARC) 86 is formed on the nonmagnetic metal layer 85. Next, the photoresist mask 81 is formed on the anti-reflective coating 86. The shape and the forming method of the photoresist mask 81 are the same as those in the first embodiment.

Figure 25A:
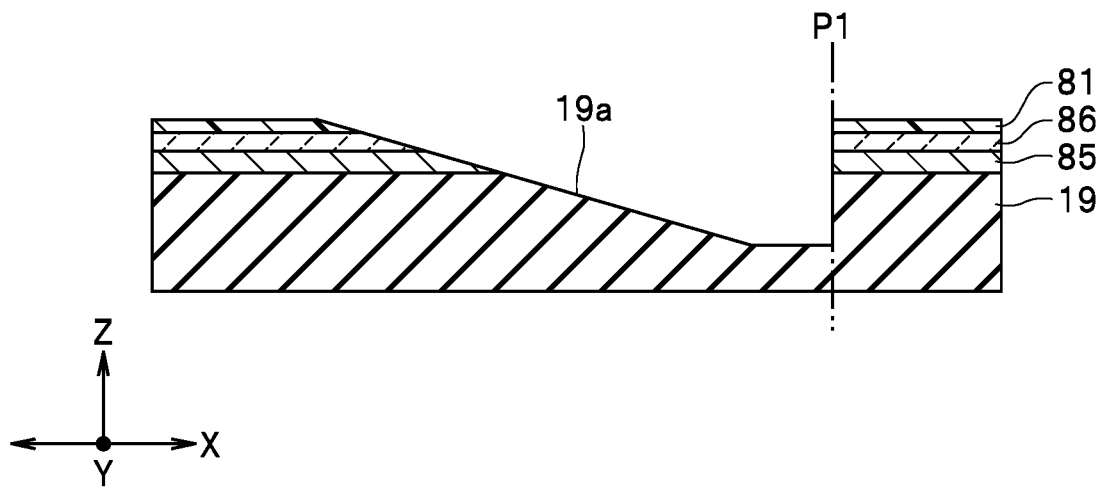
FIGS. 25A and 25B are cross-sectional views showing a step that follows the step shown in FIGS. 24A and 24B.
Figure 25B:
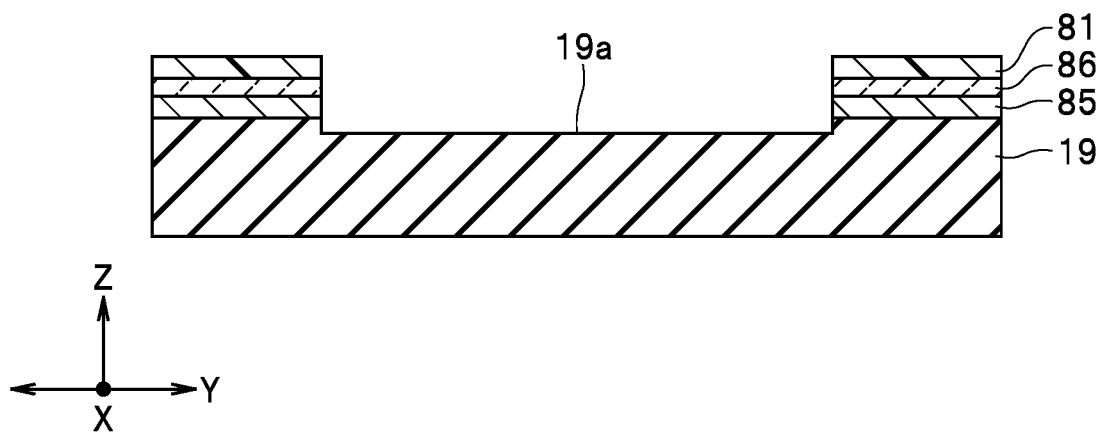

FIGS. 25A and 25B show the next step. In this step, the cladding layer 19, the nonmagnetic metal layer 85, the anti-reflective coating 86, and the photoresist mask 81 are etched so that the accommodation portion 19a for accommodating the first layer 41 of the core 40 is formed in the cladding layer 19. This etching is performed by using, for example, IBE.

Figure 26A:
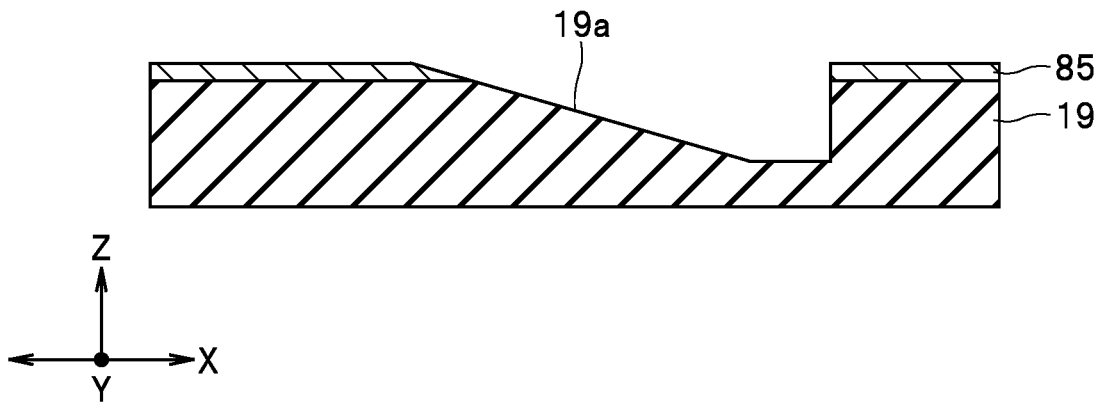
FIGS. 26A and 26B are cross-sectional views showing a step that follows the step shown in FIGS. 25A and 25B.
Figure 26B:
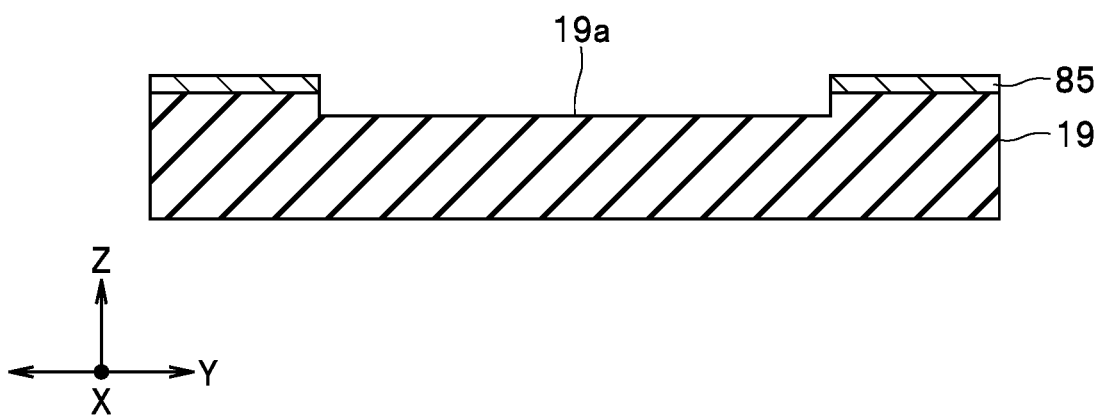

FIGS. 26A and 26B show the next step. In this step, the photoresist mask 81 and the anti-reflective coating 86 are removed. The photoresist mask 81 and the anti-reflective coating 86 may be simultaneously removed by using at least one of the following methods, wet etching, RIE using $O_2$, and ashing.

Figure 27A:
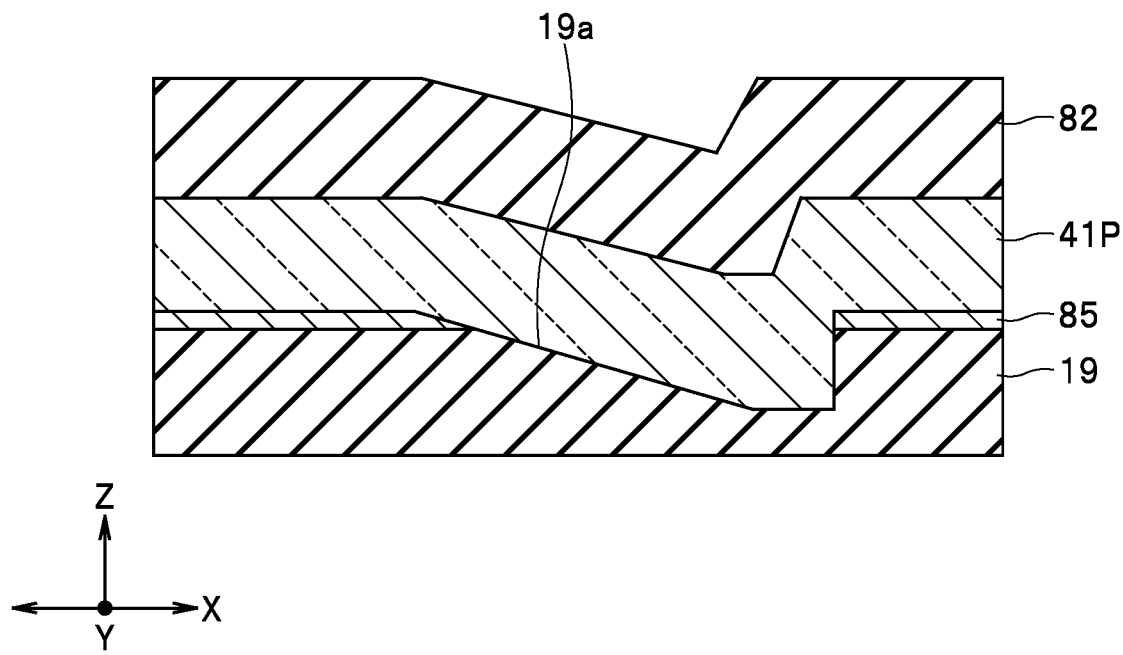
FIGS. 27A and 27B are cross-sectional views showing a step that follows the step shown in FIGS. 26A and 26B.
Figure 27B:
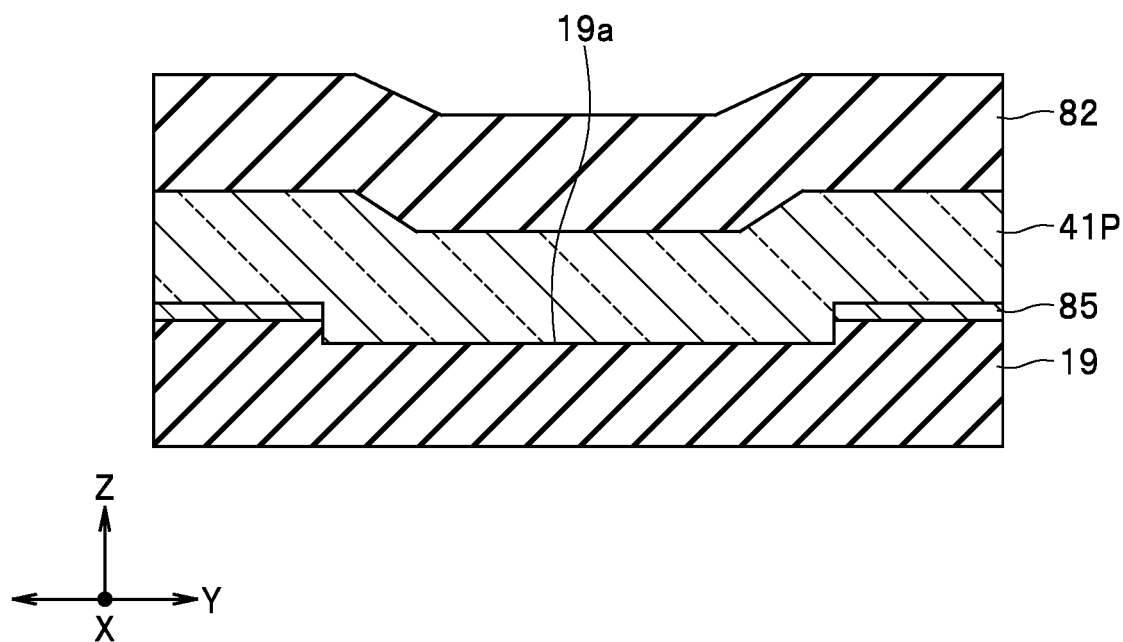

FIGS. 27A and 27B show the next step. In this step, the dielectric layer 41P, which later becomes the first layer 41 of the core 40, is initially formed on the cladding layer 19 and the nonmagnetic metal layer 85. Next, the sacrifice layer 82 is formed on the dielectric layer 41P.

Figure 28A:
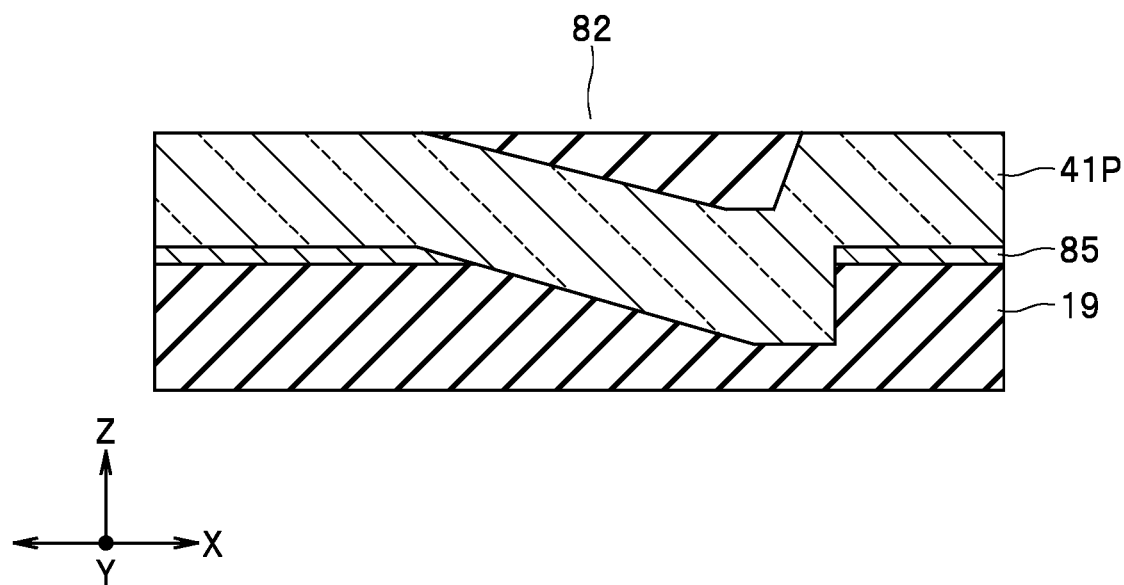
FIGS. 28A and 28B are cross-sectional views showing a step that follows the step shown in FIGS. 27A and 27B.
Figure 28B:
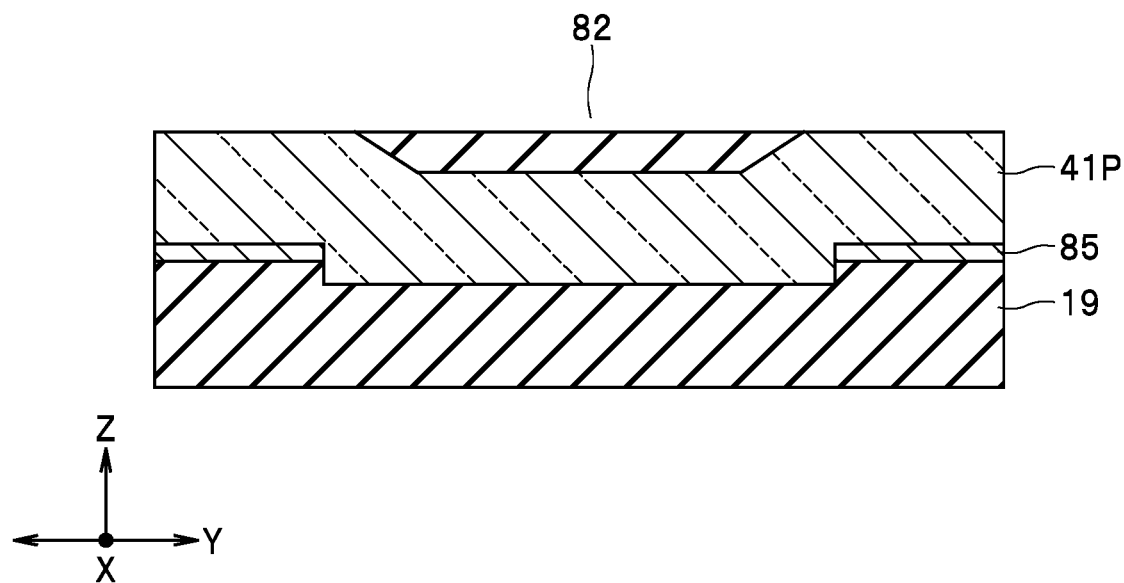

FIGS. 28A and 28B show the next step. In this step, the sacrifice layer 82 is polished by, for example, CMP until the dielectric layer 41P is exposed.

Figure 29A:
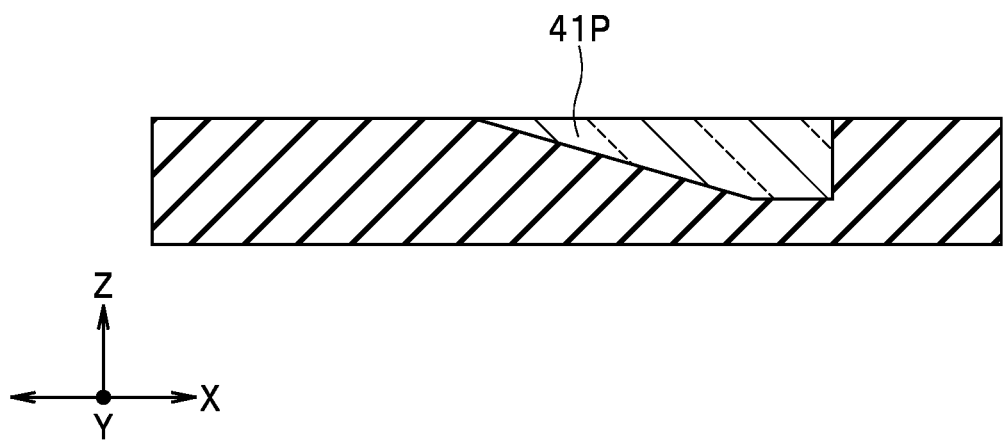
FIGS. 29A and 29B are cross-sectional views showing a step that follows the step shown in FIGS. 28A and 28B.
Figure 29B:
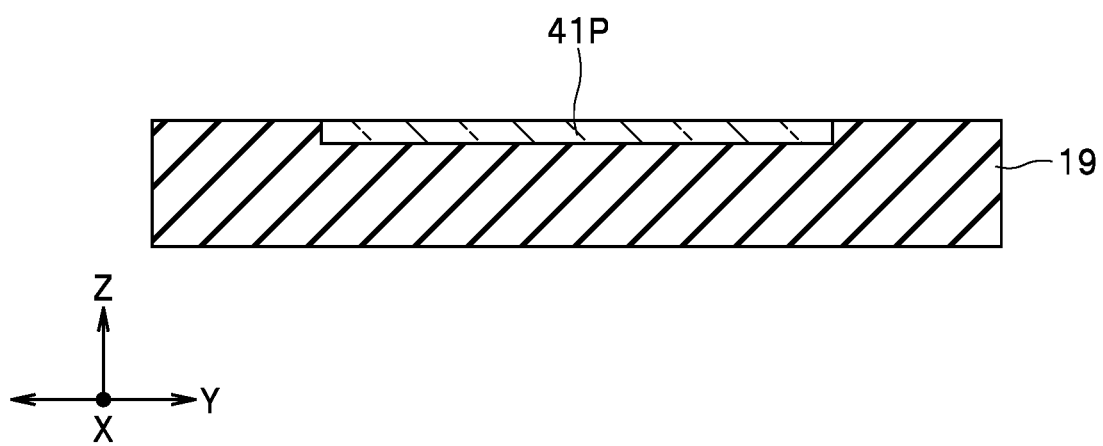

FIGS. 29A and 29B show the next step. In this step, the dielectric layer 41P, the sacrifice layer 82, and the nonmagnetic metal layer 85 are etched by, for example, IBE. This etching is performed until the maximum thickness of the dielectric layer 41P located in the accommodation portion 19a of the cladding layer 19 reaches a target thickness. The nonmagnetic metal layer 85 is removed by this etching. The subsequent steps are similar to those of the first embodiment.

As described above, in the manufacturing method for the waveguide according to the present invention, the step of forming the core 40 includes the steps of forming the nonmagnetic metal layer 85 on the cladding layer 19 and forming the anti-reflective coating 86 on the nonmagnetic metal layer 85 before the step of forming the photoresist mask 81.

To improve the patterning precision of the photoresist mask 81, it is preferable to cut off reflection light from under the photoresist mask 81 or make the reflectance under the photoresist mask 81 uniform. According to the present embodiment, the reflection light can be cut off by the nonmagnetic metal layer 85, and the reflectance of the nonmagnetic metal layer 85 can be reduced by the anti-reflective coating 86. For example, with the formation of the nonmagnetic metal layer 85 and the anti-reflective coating 86, the reflectance at 365 nm is approximately 4%.

The remainder of configuration, function and effects of the present embodiment are similar to those of the first embodiment.

The present invention is not limited to the foregoing embodiments, and various modifications may be made thereto. For example, the shapes and configurations of the core 40 are not limited to the examples described in the embodiments, and may be freely set as far as the requirements set forth in the claims are satisfied.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A waveguide comprising:
   a core allowing light to propagate therethrough; and
   a cladding located around the core, wherein
     the core is formed of a first dielectric material having a first refractive index and has an inlet on which the light is incident,
     the cladding is formed of a second dielectric material having a second refractive index lower than the first refractive index,
     the core includes:
       a first layer including a front portion and a rear portion that is located between the front portion and the inlet, and
       a second layer stacked on the first layer,
     the front portion and the rear portion each have a thickness that is a dimension in a first direction and a width that is a dimension in a second direction, the first direction being orthogonal to a propagation direction of the light, the second direction being orthogonal to the propagation direction of the light and the first direction,
     the thickness of the front portion decreases with increasing distance from the inlet,
     the first layer and the second layer each have a front end farthest from the inlet, and
     the front end of the second layer is located farther from the inlet than is the front end of the first layer.

2. The waveguide according to claim 1, wherein at least part of the width of the front portion decreases with increasing distance from the inlet.

3. The waveguide according to claim 2, wherein
   the front portion has a front end farthest from the inlet, and
   the width of the front portion at the front end is greater than the thickness of the front portion at the front end.

4. The waveguide according to claim 1, wherein
   the front portion has a top surface and a bottom surface located at opposite ends in the first direction, and
   the bottom surface is inclined so as to approach the top surface with increasing distance from the inlet.

5. The waveguide according to claim 4, wherein an angle that the bottom surface forms with respect to the propagation direction of the light falls within a range of 0.1° to 5°.

6. The waveguide according to claim 1, wherein the front portion has a minimum thickness of 80 nm or less.

7. The waveguide according to claim 1, wherein the dimension of the front portion in the propagation direction of the light falls within a range of 50 to 120 μm.

8. The waveguide according to claim 1, wherein the thickness of the rear portion is greater than or equal to the maximum thickness of the front portion.

9. The waveguide according to claim 1, wherein the width of the rear portion is greater than or equal to the maximum width of the front portion.

10. The waveguide according to claim 1, wherein
    the first layer and the second layer each further have a rear end opposite the front end, and
    the inlet is constituted by the rear end of the first layer and the rear end of the second layer.

11. A manufacturing method for a waveguide including a core allowing light to propagate therethrough and a cladding located around the core,
    the core being formed of a first dielectric material having a first refractive index and having an inlet on which the light is incident,
    the cladding being formed of a second dielectric material having a second refractive index lower than the first refractive index,
    the core including:

a first layer including a front portion and a rear portion that is located between the front portion and the inlet, and a second layer stacked on the first layer, the front portion and the rear portion each having a thickness that is a dimension in a first direction and a width that is a dimension in a second direction, the first direction being orthogonal to a propagation direction of the light, the second direction being orthogonal to the propagation direction of the light and the first direction, the thickness of the front portion decreasing with increasing distance from the inlet, the first layer and the second layer each having a front end farthest from the inlet, the front end of the second layer being located farther from the inlet than is the front end of the first layer, the manufacturing method comprising:

forming the core; and forming the cladding, wherein the forming of the cladding includes forming a part of the cladding, and forming a rest of the cladding, and the forming of the core includes forming a photoresist mask on the part of the cladding, the photoresist mask including a thickness changing portion that increases in thickness with increasing distance from a position at which the inlet is to be formed, etching the part of the cladding and the photoresist mask so that an accommodation portion for accommodating the front portion and the rear portion is formed in the part of the cladding, and forming the front portion and the rear portion in the accommodation portion.

12. The manufacturing method for a waveguide according to claim 11, wherein the photoresist mask is formed by patterning a photoresist layer using a photomask, and the photomask includes a transmittance changing area that changes in transmittance with increasing distance from the position at which the inlet is to be formed.

13. The manufacturing method for a waveguide according to claim 12, wherein the transmittance changing area includes a plurality of graphic patterns, and each of the graphic patterns decreases in size with increasing distance from the position at which the inlet is to be formed.

14. The manufacturing method for a waveguide according to claim 13, wherein each of the graphic patterns has a size smaller than or equal to the photolithographic resolution.

15. The manufacturing method for a waveguide according to claim 13, wherein a distance between centers of adjoining two of the graphic patterns is less than or equal to the photolithographic resolution.

16. The manufacturing method for a waveguide according to claim 11, wherein the forming of the core further includes forming a metal layer on the part of the cladding before forming the photoresist mask.

17. The manufacturing method for a waveguide according to claim 16, wherein the forming of the core further includes forming an anti-reflective coating on the metal layer.

* * * * *